(12) United States Patent
Pan et al.

(10) Patent No.: US 10,656,603 B2
(45) Date of Patent: May 19, 2020

(54) METHOD AND APPARATUS FOR OPERATING MOBILE PLATFORM

(71) Applicant: SZ DJI TECHNOLOGY CO., LTD., Shenzhen (CN)

(72) Inventors: Guoxiu Pan, Shenzhen (CN); Renli Shi, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 176 days.

(21) Appl. No.: 15/868,013

(22) Filed: Jan. 11, 2018

(65) Prior Publication Data

US 2018/0157220 A1 Jun. 7, 2018

Related U.S. Application Data

(63) Continuation of application No. PCT/CN2015/089684, filed on Sep. 16, 2015.

(51) Int. Cl.
| | | |
|---|---|---|
| *G05B 9/03* | (2006.01) | |
| *B64C 39/02* | (2006.01) | |
| *B64D 43/00* | (2006.01) | |
| *G05D 1/08* | (2006.01) | |
| *G05D 1/10* | (2006.01) | |

(Continued)

(52) U.S. Cl.
CPC .............. *G05B 9/03* (2013.01); *B64C 39/024* (2013.01); *B64D 43/00* (2013.01); *G05D 1/0077* (2013.01); *G05D 1/08* (2013.01); *G05D 1/10* (2013.01); *H02P 25/03* (2016.02); *B64C 2201/145* (2013.01); *B64C 2201/146* (2013.01); *B64D 47/08* (2013.01); *G05B 2219/24182* (2013.01); *G05B 2219/24196* (2013.01); *H02P 6/16* (2013.01)

(58) Field of Classification Search
CPC ............ G05B 9/03; G05B 2219/24196; G05B 2219/24182; G05D 1/0077; G05D 1/10; G05D 1/08; H02P 25/03; H02P 6/16; B64C 2201/146; B64C 39/024; B64C 2201/145; B64D 43/00; B64D 47/08
See application file for complete search history.

(56) References Cited

U.S. PATENT DOCUMENTS 5,085,464 A * 2/1992 Behr .................... B60R 21/0176
280/735
7,301,246 B2 * 11/2007 Schou ............... B60R 21/01564
280/735

(Continued)

FOREIGN PATENT DOCUMENTS

| CN | 102023000 A | 4/2011 |
| CN | 102706505 A | 10/2012 |

(Continued)

OTHER PUBLICATIONS

The World Intellectual Property Organization (WIPO) International Search Report and Written Opinion for PCT/CN2015/089684 dated Jun. 15, 2016 11 Pages.

*Primary Examiner* — Russell Frejd
(74) *Attorney, Agent, or Firm* — Anova Law Group, PLLC

(57) ABSTRACT

A method for operating a mobile platform includes detecting a malfunction in a first sensor communicating with a sensor controller associated with the mobile platform, and switching to a second sensor communicating with the sensor controller based upon the detecting.

16 Claims, 13 Drawing Sheets

(51) Int. Cl.
*H02P 25/03* (2016.01)
*G05D 1/00* (2006.01)
*B64D 47/08* (2006.01)
*H02P 6/16* (2016.01)

(56) References Cited

U.S. PATENT DOCUMENTS

| | | | |
|---|---|---|---|
| 7,750,624 B2 * | 7/2010 | Heo | F16H 59/0204 324/207.23 |
| 2005/0126270 A1 * | 6/2005 | Shao | F02D 11/106 73/114.37 |
| 2005/0248306 A1 | 11/2005 | Chen et al. | |
| 2006/0075809 A1 * | 4/2006 | Shao | F02D 11/106 73/114.36 |
| 2006/0224357 A1 | 10/2006 | Taware et al. | |
| 2009/0261796 A1 * | 10/2009 | Ito | B60R 16/03 323/285 |
| 2011/0035149 A1 | 2/2011 | McAndrew et al. | |
| 2014/0244078 A1 | 8/2014 | Downey et al. | |
| 2015/0073624 A1 | 3/2015 | Takahashi et al. | |
| 2016/0010582 A1 * | 1/2016 | Mehr | F02D 41/22 701/110 |
| 2017/0155400 A1 * | 6/2017 | Taki | B62D 5/006 |
| 2017/0221661 A1 * | 8/2017 | Kernebeck | H03K 17/972 |

FOREIGN PATENT DOCUMENTS

| | | |
|---|---|---|
| CN | 102915038 A | 2/2013 |
| CN | 103529692 A | 1/2014 |
| CN | 203786564 U | 8/2014 |
| CN | 104678764 A | 6/2015 |
| EP | 1970781 A1 | 9/2008 |
| JP | S63276404 A | 11/1988 |
| JP | H06255594 A | 9/1994 |
| JP | 2007198254 A | 8/2007 |
| JP | 2012158700 A | 8/2012 |
| WO | 2012050470 A1 | 4/2012 |

* cited by examiner

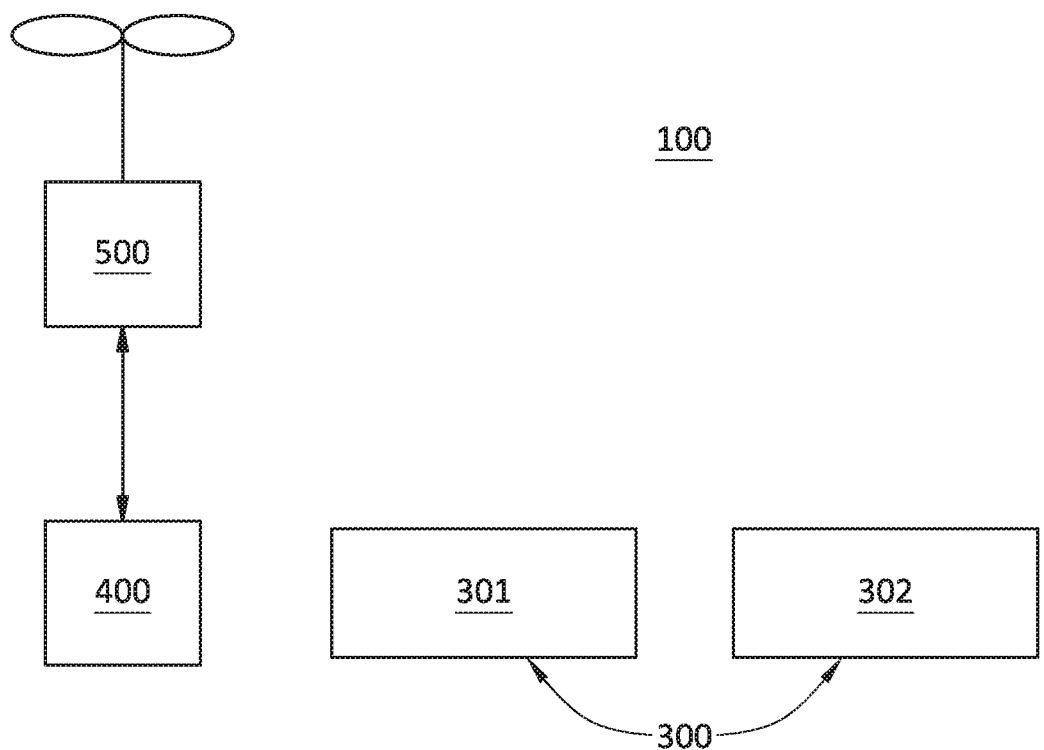
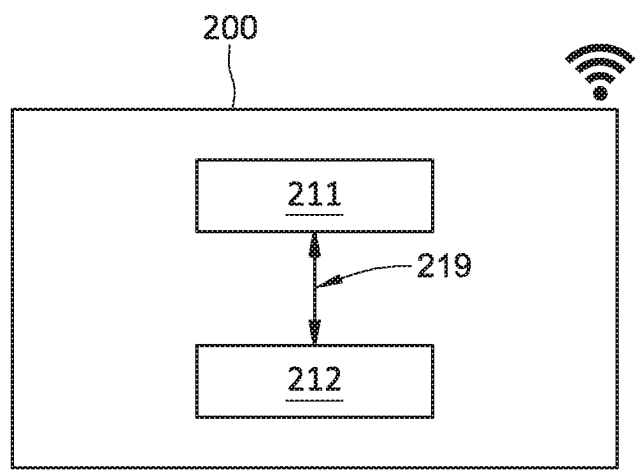
FIG. 6

METHOD AND APPARATUS FOR OPERATING MOBILE PLATFORM

CROSS-REFERENCE TO RELATED APPLICATION

This is a continuation application of International Application No. PCT/CN2015/089684, filed on Sep. 16, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platforms and more particularly, but not exclusively, to methods and apparatuses for operating a mobile platform.

BACKGROUND

Mobile platforms, such as manned and unmanned vehicles, can be used for performing surveillance, reconnaissance, and exploration tasks for military and civilian applications.

For example, an unmanned aerial vehicle (UAV) may be outfitted with a functional payload, such as a sensor for collecting data from the surrounding environment or a substance to be delivered to a destination. The UAV is usually controlled either autonomously by onboard computers or by the remote control of a pilot on the ground. Reliability and safety is essential for UAV operation. However, existing UAVs are often subjected to accidents such as crashes, collisions, and loss of control. Thus, improvement is desired in reliability and safety of the UAVs.

In view of the foregoing, there is a need for methods and apparatuses for operating mobile platforms that overcome the disadvantages of currently-available methods and apparatuses.

SUMMARY

The present disclosure relates to an apparatus for operating a mobile platform and methods for making and using same.

In accordance with a first aspect disclosed herein, there is set forth a method for operating a mobile platform, including:

detecting a malfunction in a first sensor communicating with a sensor controller associated with the mobile platform; and switching to a second sensor communicating with the sensor controller based upon the detecting.

In some embodiments of the disclosed method, the detecting includes detecting the malfunction in the first sensor communicating with the sensor controller associated with the mobile platform, wherein the mobile platform includes an unmanned aerial vehicle (UAV).

In some embodiments of the disclosed method, the switching includes switching to the second sensor configured to generate data of a same sensor data type as data associated with the first sensor.

In some embodiments of the disclosed method, the detecting the malfunction includes detecting an anomaly in first data associated with the first sensor.

In some embodiments of the disclosed method, the detecting the anomaly includes obtaining the first data associated with the first sensor.

In some embodiments of the disclosed method, the switching includes eliminating the first sensor from a sensor data source for controlling the mobile platform.

In some embodiments of the disclosed method, the switching includes switching to the second sensor in the sensor data source for controlling the mobile platform.

In some embodiments of the disclosed method, the switching includes enabling the second sensor configured to communicate with a same sensor controller as the first sensor.

In some embodiments of the disclosed method, the method further includes obtaining respective first and second data generated by the first and the sensor sensors before the detecting, wherein the switching includes receiving the second data and not receiving the first data.

In some embodiments of the disclosed method, the switching includes selecting the second sensor affected by a cause of the malfunction differently relative to the first sensor.

In some embodiments of the disclosed method:

the detecting includes detecting the malfunction in a first global positioning system (GPS) sensor associated with a first antenna; and the switching includes selecting a second GPS sensor being at least one of:

positioned away from the first GPS sensor by a predetermined distance; and associated with a second antenna having a different multipath resistance from the first antenna.

In some embodiments of the disclosed method:

the detecting includes detecting the malfunction in a first compass; and the switching includes selecting a second compass being positioned at least one of:

away from the first compass by a predetermined distance; and farther than the first compass from the ground; and farther than the first compass from a selected motor associated with the mobile platform.

In some embodiments of the disclosed method, the method further includes processing data generated by at least one sensor in the sensor data source to provide sensor data of a sensor data type.

In some embodiments of the disclosed method, the method further includes controlling the mobile platform based on the provided sensor data.

In some embodiments of the disclosed method, the method further includes sending the provided sensor data to a main controller for controlling the mobile platform.

In some embodiments of the disclosed method, the processing includes:

selecting a sensor in the sensor data source; and identifying data generated by the selected sensor as the sensor data of the sensor data type.

In some embodiments of the disclosed method, the selecting includes:

selecting a sensor among two sensors in the sensor data source each being associated with respective weights and configured to generate data of the sensor data type, the weights being based on accuracy of the two sensors; and selecting the sensor associated with a higher weight before detecting a malfunction in the sensor associated with the higher weight.

In some embodiments of the disclosed method, the selecting includes selecting the sensor associated with a lower weight among the two sensors upon detecting the malfunction in the sensor associated with the higher weight.

In some embodiments of the disclosed method, the processing includes providing a weighted average of data generated by a plurality of sensors as the sensor data of a sensor data type.

In some embodiments of the disclosed method, the processing includes providing the weighted average including at least one of:

a greater weight for a sensor having a greater accuracy; and an equal weight for two or more selected sensors of the plurality of sensors.

In some embodiments of the disclosed method, the detecting the anomaly includes detecting that the first data has remained constant during a predetermined time interval.

In some embodiments of the disclosed method, the detecting the anomaly includes detecting that noise associated with the first data is greater than a predetermined noise level.

In some embodiments of the disclosed method, the detecting the anomaly includes detecting a discontinuity in the first data that is greater than a predetermined discontinuity level.

In some embodiments of the disclosed method, the detecting the malfunction includes detecting the malfunction in the first sensor including a GPS sensor, and wherein the switching includes switching to the second sensor upon detecting at least one of:

loss of a satellite signal with the GPS sensor; and inconsistency between respective changes of a location and a speed of the mobile platform according to the GPS sensor.

In some embodiments of the disclosed method, the detecting the anomaly includes detecting that the first data satisfies a cross-validation criterion including that:

the first data are inconsistent with respective data associated with a third sensor and a fourth sensor each being associated with the mobile platform; and the data associated with the third sensor is in agreement with the data associated with the fourth sensor.

In some embodiments of the disclosed method, the detecting the anomaly includes detecting that the first data satisfies the cross-validation criterion, wherein:

the first data are of a first sensor data type; and data associated with the third sensor are of a second sensor data type being different from the first sensor data type.

In some embodiments of the disclosed method, the detecting includes detecting that:

the first data are inconsistent with respective data associated with the third sensor and the fourth sensor for ascertaining a height of the mobile platform, wherein the first data associated with the first sensor and the data associated with the third sensor being one of altimeter data type and visual odometer data type, respectively.

In accordance with another aspect disclosed herein, there is set forth an apparatus for operating a mobile platform, including a sensor controller associated with the mobile platform and communicating with a first sensor and a second sensor, wherein the sensor controller includes one or more processors configured to:

detect a malfunction in the first sensor; and switch to the second sensor based upon the detected malfunction.

In some embodiments of the disclosed apparatus, the mobile platform includes an unmanned aerial vehicle (UAV).

In some embodiments of the disclosed apparatus, the second sensor is configured to generate data of a same sensor data type as data associated with the first sensor.

In some embodiments of the disclosed apparatus, the second sensor is affected by a cause of the malfunction differently relative to the first sensor.

In some embodiments of the disclosed apparatus, the one or more processors are configured to detect an anomaly in first data associated with the first sensor.

In some embodiments of the disclosed apparatus, the one or more processors are configured to obtain the first data associated with the first sensor.

In some embodiments of the disclosed apparatus, the one or more processors are configured to eliminate the first sensor from a sensor data source for controlling the mobile platform.

In some embodiments of the disclosed apparatus, the one or more processors are configured to enable the second sensor in the sensor data source for controlling the mobile platform.

In some embodiments of the disclosed apparatus, the second sensor is configured to communicate with a same sensor controller as the first sensor.

In some embodiments of the disclosed apparatus, the second sensor is affected by a cause of the malfunction differently relative to the first sensor.

In some embodiments of the disclosed apparatus, the one or more processors are configured to process data generated by at least one sensor in the sensor data source to provide sensor data of a sensor data type.

In some embodiments of the disclosed apparatus, the one or more processors are configured to control the mobile platform based on the provided sensor data.

In some embodiments of the disclosed apparatus, the one or more processors are configured to send the provided sensor data to a main controller for controlling the mobile platform.

In some embodiments of the disclosed apparatus, the one or more processors are configured to:

select a sensor in the sensor data source; and identify data generated by the selected sensor as the sensor data of the sensor data type.

In some embodiments of the disclosed apparatus, the one or more processors are configured to select the sensor associated with a higher weight among two sensors in the sensor data source each being associated with a respective weight and configured to generate data of the sensor data type, wherein the weights are based on accuracy of the two sensors.

In some embodiments of the disclosed apparatus, the one or more processors are configured to select the sensor associated with a lower weight among the two sensors upon detecting a malfunction in the sensor associated with the higher weight.

In some embodiments of the disclosed apparatus, the one or more processors are configured to provide a weighted average of data generated by a plurality of sensors as the sensor data of a sensor data type.

In some embodiments of the disclosed apparatus, the weighted average includes at least one of:

a greater weight for a sensor having a greater accuracy; and an equal weight for two or more selected sensors of the plurality of sensors.

In some embodiments of the disclosed apparatus, the anomaly in the first sensor includes the first data having remained constant during a predetermined time interval.

In some embodiments of the disclosed apparatus, the anomaly in the first sensor includes noise associated with the first data being greater than a predetermined noise level.

In some embodiments of the disclosed apparatus, the anomaly in the first sensor includes a discontinuity in the first data being greater than a predetermined discontinuity level.

In some embodiments of the disclosed apparatus, the first sensor includes a global positioning system (GPS) sensor, and wherein the anomaly in the first sensor includes at least one of:

loss of a satellite signal with the GPS sensor; and inconsistency between respective changes of a location and a speed of the mobile platform according to the GPS sensor.

In some embodiments of the disclosed apparatus, the anomaly in the first sensor includes the first data satisfying a cross-validation criterion.

In some embodiments of the disclosed apparatus, the cross-validation criterion includes that:

the first data are inconsistent with respective data associated with a third sensor and a fourth sensor each being associated with the mobile platform; and the data associated with the third sensor is in agreement with the data associated with the fourth sensor.

In some embodiments of the disclosed apparatus, the cross-validation criterion further includes that:

the first data are of a first sensor data type; and data associated with at least one of the third sensor and the fourth sensor are of a second sensor data type being different from the first sensor data type.

In accordance with another aspect disclosed herein, there is set forth an unmanned aerial vehicle (UAV), including:

a sensor controller associated with the UAV; and a first sensor and a second sensor each communicating with the sensor controller, the sensor controller being configured to:

detect a malfunction in the first sensor; and switch to the second sensor based upon the detected malfunction.

In some embodiments of the disclosed UAV, the second sensor is configured to generate data of a same sensor data type as data associated with the first sensor.

In some embodiments of the disclosed UAV, the sensor controller is configured to detect an anomaly in first data associated with the first sensor.

In some embodiments of the disclosed UAV, the sensor controller is configured to obtain the first data associated with the first sensor.

In some embodiments of the disclosed UAV, the sensor controller is configured to eliminate the first sensor from a sensor data source for controlling the mobile platform.

In some embodiments of the disclosed UAV, the sensor controller is configured to enable the second sensor in the sensor data source for controlling the mobile platform.

In some embodiments of the disclosed UAV, the second sensor is configured to communicate with a same sensor controller as the first sensor.

In some embodiments of the disclosed UAV, the sensor controller is configured to process data generated by at least one sensor in the sensor data source to provide sensor data of a sensor data type.

In some embodiments of the disclosed UAV, the sensor controller is configured to control the mobile platform based on the provided sensor data.

In some embodiments of the disclosed UAV, the UAV further includes a main controller for controlling the mobile platform, wherein the sensor controller is configured to send the provided sensor data to the main controller.

In some embodiments of the disclosed UAV, the sensor controller is configured to:

select a sensor in the sensor data source; and identify data generated by the selected sensor as the sensor data of the sensor data type.

In some embodiments of the disclosed UAV, the sensor controller is configured to select the sensor associated with a higher weight among two sensors in the sensor data source each being associated with a respective weight and configured to generate data of the sensor data type.

In some embodiments of the disclosed UAV, the sensor controller is configured to select the sensor associated with a lower weight among the two sensors upon detecting a malfunction in the sensor associated with the higher weight.

In some embodiments of the disclosed UAV, the sensor controller is configured to provide a weighted average of data generated by a plurality of sensors as the sensor data of a sensor data type.

In some embodiments of the disclosed UAV, the weighted average includes at least one of:

a greater weight for a sensor having a greater accuracy; and an equal weight for two or more selected sensors of the plurality of sensors.

In some embodiments of the disclosed UAV, the anomaly in the first sensor includes the first data having remained constant during a predetermined time interval.

In some embodiments of the disclosed UAV, the anomaly in the first sensor includes noise associated with the first data being greater than a predetermined noise level.

In some embodiments of the disclosed UAV, the anomaly in the first sensor includes a discontinuity in the first data being greater than a predetermined discontinuity level.

In some embodiments of the disclosed UAV, the first sensor includes a global positioning system (GPS) sensor, and wherein the anomaly in the first sensor includes at least one of:

loss of a satellite signal with the GPS sensor; and inconsistency between respective changes of a location and a speed of the mobile platform according to the GPS sensor.

In some embodiments of the disclosed UAV, the anomaly in the first sensor includes the first data satisfying a cross-validation criterion.

In some embodiments of the disclosed UAV, the cross-validation criterion includes that:

the first data are inconsistent with respective data associated with a third sensor and a fourth sensor each being associated with the mobile platform; and the data associated with the third sensor is in agreement with the data associated with the fourth sensor.

In some embodiments of the disclosed UAV, the cross-validation criterion further includes that:

the first data are of a first sensor data type; and data associated with at least one of the third sensor and the fourth sensor are of a second sensor data type being different from the first sensor data type.

In accordance with another aspect disclosed herein, there is set forth a kit for assembling an unmanned aerial vehicle (UAV), including:

a sensor controller configured to be associated with the UAV; and a first sensor and a second sensor each configured to communicate with the sensor controller, the sensor controller being configured to:

detect a malfunction in the first sensor; and switch to the second sensor based upon the detected malfunction.

In some embodiments of the disclosed kit, the second sensor is configured to generate data of a same sensor data type as data associated with the first sensor.

In some embodiments of the disclosed kit, the sensor controller is configured to detect an anomaly in first data associated with the first sensor.

In some embodiments of the disclosed kit, the sensor controller is configured to obtain the first data associated with the first sensor.

In some embodiments of the disclosed kit, the sensor controller is configured to eliminate the first sensor from a sensor data source for controlling the mobile platform.

In some embodiments of the disclosed kit, the sensor controller is configured to enable the second sensor in the sensor data source for controlling the mobile platform.

In some embodiments of the disclosed kit, the second sensor is configured to communicate with a same sensor controller as the first sensor.

In some embodiments of the disclosed kit, the sensor controller is configured to process data generated by at least one sensor in the sensor data source to provide sensor data of a sensor data type.

In some embodiments of the disclosed kit, the sensor controller is configured to control the mobile platform based on the provided sensor data.

In some embodiments of the disclosed kit, the kit further includes a main controller for controlling the mobile platform, wherein the sensor controller is configured to send the provided sensor data to the main controller.

In some embodiments of the disclosed kit, the sensor controller is configured to:

select a sensor in the sensor data source; and identify data generated by the selected sensor as the sensor data of the sensor data type.

In some embodiments of the disclosed kit, the sensor controller is configured to select the sensor associated with a higher weight among two sensors in the sensor data source each being associated with a respective weight and configured to generate data of the sensor data type.

In some embodiments of the disclosed kit, the sensor controller is configured to select the sensor associated with a lower weight among the two sensors upon detecting a malfunction in the sensor associated with the higher weight.

In some embodiments of the disclosed kit, the sensor controller is configured to provide a weighted average of data generated by a plurality of sensors as the sensor data of a sensor data type.

In some embodiments of the disclosed kit, the weighted average includes at least one of:

a greater weight for a sensor having a greater accuracy; and an equal weight for two or more selected sensors of the plurality of sensors.

In some embodiments of the disclosed kit, the anomaly in the first sensor includes the first data having remained constant during a predetermined time interval.

In some embodiments of the disclosed kit, the anomaly in the first sensor includes noise associated with the first data being greater than a predetermined noise level.

In some embodiments of the disclosed kit, the anomaly in the first sensor includes a discontinuity in the first data being greater than a predetermined discontinuity level.

In some embodiments of the disclosed kit, the first sensor includes a global positioning system (GPS) sensor, and wherein the anomaly in the first sensor includes at least one of:

loss of a satellite signal with the GPS sensor; and inconsistency between respective changes of a location and a speed of the mobile platform according to the GPS sensor.

In some embodiments of the disclosed kit, the anomaly in the first sensor includes the first data satisfying a cross-validation criterion.

In some embodiments of the disclosed kit, the cross-validation criterion includes that:

the first data are inconsistent with respective data associated with a third sensor and a fourth sensor each being associated with the mobile platform; and the data associated with the third sensor is in agreement with the data associated with the fourth sensor.

In some embodiments of the disclosed kit, the cross-validation criterion further includes that:

the first data are of a first sensor data type; and data associated with at least one of the third sensor and the fourth sensor are of a second sensor data type being different from the first sensor data type.

In accordance with another aspect disclosed herein, there is set forth a computer program product including instructions for the method for operating a mobile platform.

In accordance with another aspect disclosed herein, there is set forth an apparatus for operating a mobile platform, including:

a detecting module configured to detect a malfunction in a first sensor; and a switching module configured to switch to a second sensor based upon the detected malfunction.

In some embodiments of the disclosed apparatus, the mobile platform includes an unmanned aerial vehicle (UAV).

In some embodiments of the disclosed apparatus, the second sensor is configured to generate data of a same sensor data type as data associated with the first sensor.

In some embodiments of the disclosed apparatus, the detecting module is configured to detect an anomaly in first data associated with the first sensor.

In some embodiments of the disclosed apparatus, the apparatus further includes an obtaining module configured to obtain the first data associated with the first sensor.

In some embodiments of the disclosed apparatus, the switching module is configured to eliminate the first sensor from a sensor data source for controlling the mobile platform.

In some embodiments of the disclosed apparatus, the switching module is configured to enable the second sensor in the sensor data source for controlling the mobile platform.

In some embodiments of the disclosed apparatus, the second sensor is configured to communicate with a same sensor controller as the first sensor.

In some embodiments of the disclosed apparatus, the apparatus further includes a processing module configured to process data generated by at least one sensor in the sensor data source to provide sensor data of a sensor data type.

In some embodiments of the disclosed apparatus, the apparatus further includes a controlling module configured to control the mobile platform based on the provided sensor data.

In some embodiments of the disclosed apparatus, the apparatus further includes a communication module configured to send the provided sensor data to a main controller for controlling the mobile platform.

In some embodiments of the disclosed apparatus, the processing module is configured to:

select a sensor in the sensor data source; and identify data generated by the selected sensor as the sensor data of the sensor data type.

In some embodiments of the disclosed apparatus, the processing module is configured to select the sensor associated with a higher weight among two sensors in the sensor data source each being associated with a respective weight and configured to generate data of the sensor data type.

In some embodiments of the disclosed apparatus, the processing module is configured to select the sensor associated with a lower weight among the two sensors upon detecting a malfunction in the sensor associated with the higher weight.

In some embodiments of the disclosed apparatus, the processing module is configured to provide a weighted average of data generated by a plurality of sensors as the sensor data of a sensor data type.

In some embodiments of the disclosed apparatus, the weighted average includes at least one of:

a greater weight for a sensor having a greater accuracy; and an equal weight for two or more selected sensors of the plurality of sensors.

In some embodiments of the disclosed apparatus, the anomaly in the first sensor includes the first data having remained constant during a predetermined time interval.

In some embodiments of the disclosed apparatus, the anomaly in the first sensor includes noise associated with the first data being greater than a predetermined noise level.

In some embodiments of the disclosed apparatus, the anomaly in the first sensor includes a discontinuity in the first data being greater than a predetermined discontinuity level.

In some embodiments of the disclosed apparatus, the first sensor includes a global positioning system (GPS) sensor, and wherein the anomaly in the first sensor includes at least one of:

loss of a satellite signal with the GPS sensor; and inconsistency between respective changes of a location and a speed of the mobile platform according to the GPS sensor.

In some embodiments of the disclosed apparatus, the anomaly in the first sensor includes the first data satisfying a cross-validation criterion.

In some embodiments of the disclosed apparatus, the cross-validation criterion includes that:

the first data are inconsistent with respective data associated with a third sensor and a fourth sensor each being associated with the mobile platform; and the data associated with the third sensor is in agreement with the data associated with the fourth sensor.

In some embodiments of the disclosed apparatus, the cross-validation criterion further includes that:

the first data are of a first sensor data type; and data associated with at least one of the third sensor and the fourth sensor are of a second sensor data type being different from the first sensor data type.

BRIEF DESCRIPTION OF THE DRAWINGS

FIG. 6 is an exemplary diagram illustrating still another alternative embodiment of the mobile platform of FIG. 1, wherein the sensor controller is located remotely from the mobile platform.

Figure 1:
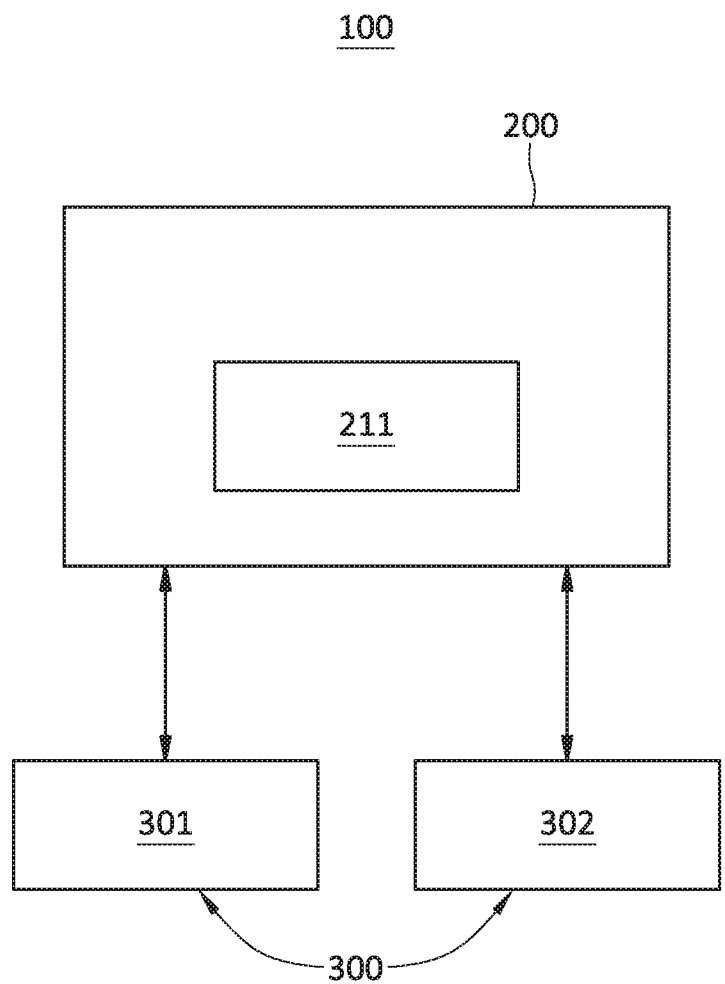
FIG. 1 is an exemplary diagram illustrating an embodiment of a mobile platform including a sensor controller.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

The present disclosure sets forth methods and apparatuses for operating a mobile platform, overcoming disadvantages of prior methods and apparatuses.

Since currently-available methods and apparatuses are incapable of ensuring high reliability in operating a mobile platform, a method and apparatus that improves reliability in operating a mobile platform and prevents accidents or damage to the mobile platform can prove desirable and provide a basis for a wide range of applications, such as mobile platforms to be used in harsh conditions where probability of accidents tends to be high and/or safe operation is crucial. This result can be achieved, according to embodiments disclosed herein, by a mobile platform 100 as illustrated in FIG. 1.

Examples of the mobile platform 100 can include, but are not limited to, bicycles, automobiles, trucks, ships, boats, trains, helicopters, aircraft, various hybrids thereof, and the like. In some embodiments, the mobile platform 100 is an unmanned aerial vehicle (UAV). Colloquially referred to as "drones," UAVs are aircraft without a human pilot (or operator) onboard the vehicle whose flight is controlled autonomously or by a remote pilot (or sometimes both). UAVs are now finding increased usage in civilian applications involving various aerial operations, such as data-gathering or delivery. The present systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

The mobile platform 100 can include a sensor controller 200 for operating the mobile platform 100. The sensor controller 200 can include a processor 211 for performing data acquisition, data processing, and/or any other functions and operations described herein for implementing a function of the sensor controller 200. Without limitation, the processor 211 can include one or more general purpose microprocessors (for example, single and/or multi-core processors), application-specific integrated circuits, application-specific instruction-set processors, graphics processing units, physics processing units, digital signal processing units, coprocessors, network processing units, audio processing units, encryption processing units, and/or the like. Although described as including a single processor 211 for purposes of illustration only, the sensor controller 200 can include any suitable number of uniform and/or different processors 211.

In certain examples, the processor 211 can include one or more microprocessors configured to communicate with peripheral devices in the mobile platform 100. Exemplary peripheral devices can include sensors 300. A microprocessor can include a computer processor that incorporates the functions of a computer's central processing unit (CPU) on one or more integrated circuits. The microprocessor can be a multipurpose and/or programmable device that accepts digital data as input, processes the digital data according to instructions stored in a memory (not shown), and provides results as output. Microprocessors can operate on numbers and symbols represented in a binary numeral system. For example, the sensor controller 200 can receive data from the sensors 300 as the input, process the data according to instructions stored in the memory and provide results of processing the data as output. The sensor controller 200 can be programmed to implement functions disclosed in the present disclosure.

An exemplary microprocessor might include an arithmetic logic unit (ALU) and/or a control logic section. The ALU can perform operations such as mathematical calculations and logic operations such as AND or OR. The control logic section can retrieve instruction operation codes from the memory, and initiate a sequence of operations of the ALU required to carry out the instruction.

The sensor controller 200 can be configured to communicate with one or more sensors 300. As shown in FIG. 1, for example, the sensors 300 can include a first sensor 301 and/or a second sensor 302. The first sensor 301 and/or the second sensor 302 can be associated with the mobile platform 100. That is, the first sensor 301 and/or the second sensor 302 can be configured to obtain data associated with the mobile platform 100. The first sensor 301 and/or the second sensor 302 can be located onboard the mobile platform 100 and/or remotely from the mobile platform 100.

Each of the first sensor 301 and the second sensor 302 can be configured to sense a characteristic of the mobile platform 100 and/or the environment surrounding the mobile platform 100, to generate data thereof, and transmit the data to the sensor controller 200. The second sensor 302 can be configured to generate data of a same sensor data type as data associated with the first sensor 301. In one example, the data generated by the first sensor 301 can be of the same sensor data type as the data generated by the second sensor 302. The first sensor 301 can be of the same sensor type as the second sensor 302.

In another example, the second sensor 302 can be configured to generate data that includes a subset of data that are of a same sensor data type as data associated with the first sensor 301.

Although described as including the first sensor 301 and the second sensor 302 for purposes of illustration only, the sensors 300 can include any suitable number of uniform and/or different sensors, such as a third sensor, a fourth sensor, a fifth sensor, without limitation.

A sensor data type can refer to a description including a characteristic of data associated with a sensor. The characteristic can include a certain feature and/or quality associated with the data.

For example, the sensor data type can describe a technique associated with the data. In one illustrative example, each of the first sensor 301 and the second sensor 302 can include a global positioning system (GPS) sensor. Thus, each of the first sensor 301 and the second sensor 302 can generate GPS sensor data. Respective data associated with the first sensor 301 and the second sensor 302 can be of the same sensor data type, and the sensor data type can be GPS sensor data type.

For example, the sensor data type can describe a usage associated with the data. In one illustrative example, each of the first sensor 301 and the second sensor 302 can include a global positioning system (GPS) sensor. Each of the first sensor 301 and the second sensor 302 can generate data to be used for calculating speed of the mobile platform 100. Respective data associated with the first sensor 301 and the second sensor 302 can be of the same sensor data type, and the sensor data type can be speed data type.

Generally, a sensor can be of a certain sensor type. A 'sensor type' can refer to a description including a characteristic of a sensor. The characteristic can include a certain feature and/or quality associated with the sensor. In certain examples, the sensor data type of data can be consistent with a sensor type of a sensor that generates the data. For example, a compass, i.e., a sensor of compass type may generate data of compass data type.

Figure 2:
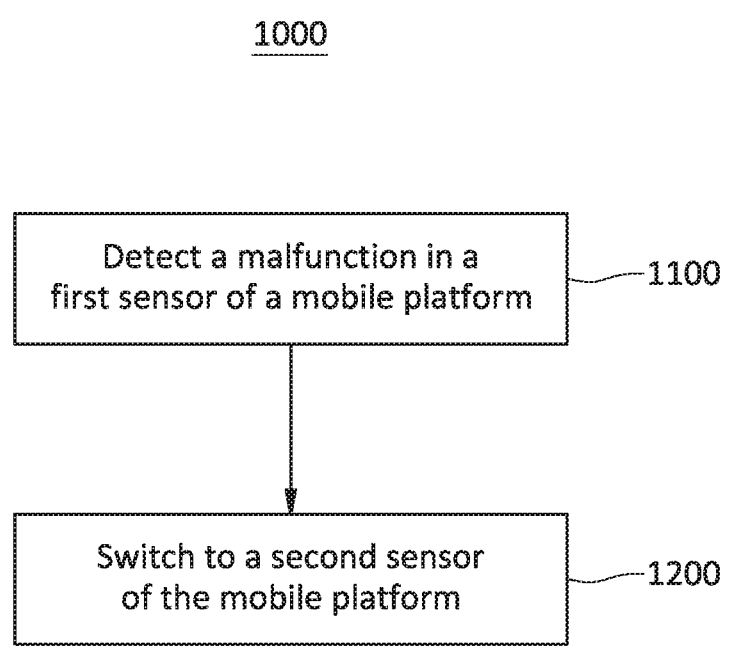
FIG. 2 is an exemplary top-level block flow chart illustrating an embodiment of a method for operating the mobile platform of FIG. 1.

FIG. 2 is an exemplary top-level block flow chart illustrating an embodiment of a method 1000 for operating the mobile platform 100 of FIG. 1. As shown in FIG. 2, a malfunction in the first sensor 301 (shown in FIG. 1) communicating with the sensor controller 200 (shown in FIG. 1) associated with the mobile platform 100 (shown in FIG. 1) is detected, at 1100. The sensor controller 200 can be configured to detect the malfunction in the first sensor 301.

The sensor controller 200 can switch, at 1200, to the second sensor 302 (shown in FIG. 1) communicating with the sensor controller 200 based upon the detecting. Switching to the second sensor 302 can include switching to the second sensor 302 in a sensor data source for controlling the mobile platform 100. The sensor data source can refer to a list that can at least partially identify sensors 300 that are not malfunctioning.

The second sensor 302 can be in the sensor data source before detecting the malfunction in the first sensor 301. In one example, switching to the second sensor 302 can include enabling the second sensor 302 in a sensor data source. That is, the second sensor 302 can be idle in the sensor data source. After detecting the malfunction in the first sensor 301, the second sensor 302 can be switched on and collect the second data. The sensor controller 200 can use the second data for controlling the mobile platform 100. In another example, switching to the second sensor 302 can include switching from first data generated by the first sensor to second data generated by the second sensor 302. That is, the second sensor 302 can send data to the sensor controller 200 in the sensor data source, but the sensor controller 200 may choose to or not to use the second data. After detecting the malfunction in the first sensor 301, the sensor controller 200 can use the second data.

Additionally and/or alternatively, the second sensor 302 can be not in the sensor data source before detecting the malfunction in the first sensor 301. In that case, switching to the second sensor 302 can include adding the second sensor 302 into the sensor data source. After detecting the malfunction in the first sensor 301, the second sensor 302 can be added (and/or included) into the sensor data source and collect sensing data. The sensor controller 200 can use the second data for controlling the mobile platform 100.

As shown in FIG. 1, the second sensor 302 can be configured to communicate with the same sensor controller 200 as the first sensor 301. Therefore, the switching can include switching to the second sensor 302 without switching the sensor controller 200. That is, prior to switching to the second sensor 302, the sensor controller 200 can obtain data of a sensor data type as that of the first sensor 301. After switching to the second sensor 302, the same sensor controller, i.e., the sensor controller 200, can obtain data of the same sensor data type from the second sensor 302.

Additionally and/or alternatively, the first sensor 301 and the second sensor 302 may or may not provide the sensor controller 200 with data of the same sensor type and/or at the same time. In one example, before the sensor controller 200 detects the malfunction in the first sensor 301 at 1100, the second sensor 302 can operate to provide data of the same sensor data type as that of the first sensor 301. When the sensor controller 200 detects the malfunction in the first sensor 301, the sensor controller 200 can use the data provided by the second sensor 302 in place of the data provided by the first sensor 301.

In another example, the second sensor 302 can initially be idle before the sensor controller 200 detects the malfunction in the first sensor 301. When the sensor controller 200 detects the malfunction in the first sensor 301, the sensor controller 200 can activate the second sensor 302 in order to use data provided by the second sensor 302 in place of the data provided by the first sensor 301.

As previously mentioned, the second sensor 302 can be configured to generate data that includes a subset of data that are of a same sensor data type as data associated with the first sensor 301. For example, the second sensor 302 can be able to generate a first subset of data that are of a same sensor data type as data associated with the first sensor 301, and a second subset of data that are of a different sensor data type as data associated with the first sensor 301. Thus, the second sensor 302 can be idle, or provide at least one of the first or the second subset of data before the sensor controller 200 detects the malfunction in the first sensor 301. When the sensor controller 200 detects the malfunction in the first sensor 301, the second sensor 302 can provide at least the first subset of data to be used in place of the data provided by the first sensor 301.

Additionally and/or alternatively, the second sensor 302 can provide the sensor controller 200 with a subset of data of the same sensor data type as the data provided by the first sensor 301. Before detecting the malfunction, the sensor controller 200 can obtain the first and second data respectively provided by the first sensor 301 and the second sensor 302. The sensor controller 200 can compare the first and second data respectively provided by the first sensor 301 and the second sensor 302 to detect the malfunction (shown at 1125 in FIG. 8). Upon detecting the malfunction in the first sensor 301, the sensor controller 200 can receive data that exclude the first data. For example, the sensor controller 200 can receive the second data generated by the second sensor 302, but not the first data generated by the first sensor 301. The sensor controller 200 can use the second data for subsequent sensor fusion process for controlling the mobile platform 100.

Figure 3:
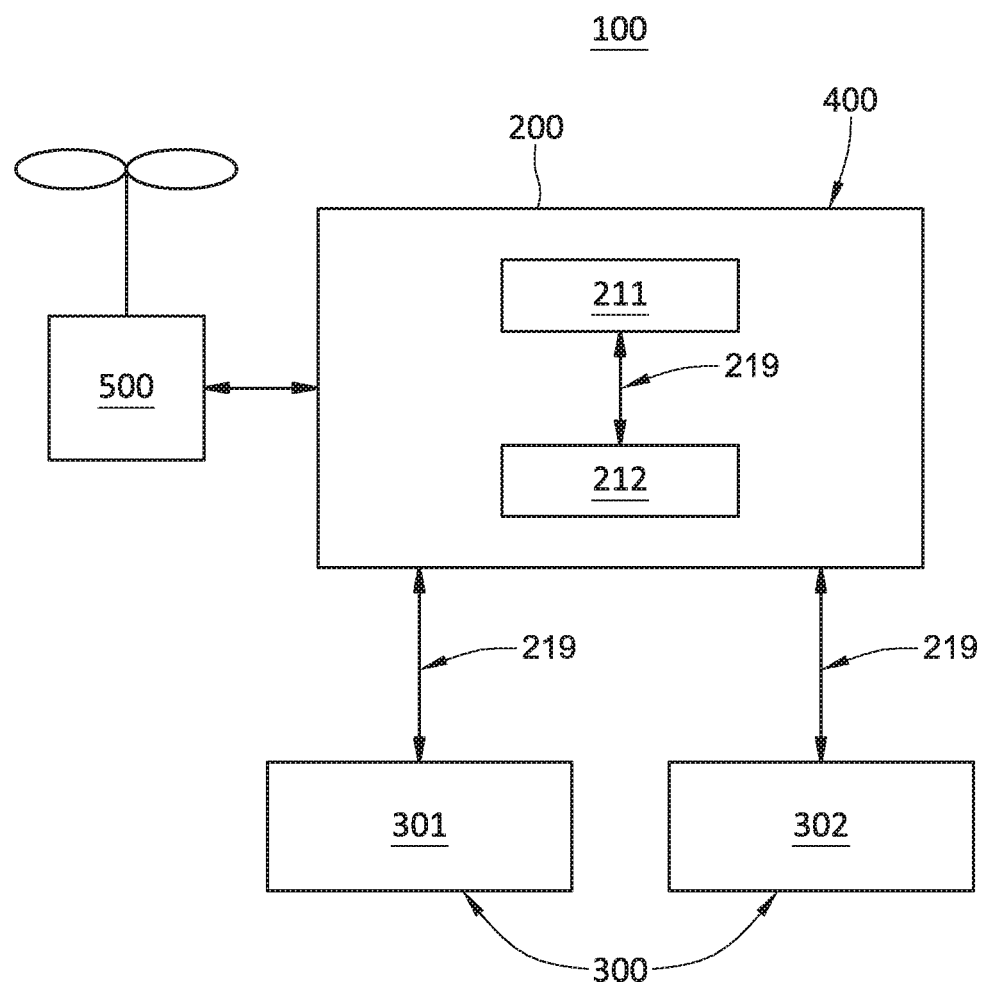
FIG. 3 is an exemplary diagram illustrating an alternative embodiment of the mobile platform of FIG. 1, wherein the sensor controller is configured to control the mobile platform.

FIG. 3 is an exemplary diagram illustrating an alternative embodiment of the mobile platform 100 of FIG. 1. As shown in FIG. 3, the mobile platform 100 can further include a main controller 400. The main controller 400 can be configured to perform data acquisition, data processing, and any other functions and operations for controlling an operation of the mobile platform 100. Exemplary operations can include steering, ascending, descending, and/or any other actions performed by the mobile platform 100. The main controller 400 can be installed onboard the mobile platform 100.

As shown in FIG. 3, the apparatus for operating the mobile platform 100 can be at least partially integrated with the main controller 400. That is, the sensor controller 200 can be at least partially integrated with the main controller 400. Thus, the sensor controller 200 can be further configured to control the mobile platform 100.

Additionally and/or alternatively, the sensor controller 200 can include a communication module 212 configured to be coupled with the processor 211. The communication module 212 can include a digital communication interface and/or an analog communication interface.

The communication module 212 can be configured to exchange data and/or control signal with the first sensor 301 and/or the second sensor 302. The communication module 212 can include a transceiver, a transmitter and/or a receiver that can include radio frequency (or RF) circuitry or any other appropriate hardware and any appropriate software instructing the hardware for receiving and/or transmitting data via a wired or wireless connection with an electronic device.

The communication module 212 can facilitate communication between the sensor controller 200 and other devices, such as the sensors 300, over one or more external communication ports (not shown), and can also include various software components for handling data received by the transceiver and/or the external communication port.

The external communication port can include any suitable electrical and/or mechanical connectors for joining electrical devices and realize communication between the electrical devices. The external communication port can be adapted for coupling directly to other devices or indirectly over a network (e.g., the Internet, wireless LAN, etc.). An exemplary external communication port can include Universal Serial Bus (USB), FIREWIRE, printed circuit board (PCB), and/or the like.

Generally, the RF circuitry can include, but be not limited to, an antenna, at least one amplifier, a tuner, one or more oscillators, a user subscriber identity module (SIM) card, a transceiver, a coupler, LNA (i.e., Low Noise Amplifier), a duplexer, etc. In addition, the RF circuitry can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

Although described as including a single communication module 212 for purposes of illustration only, the sensor controller 200 can include any suitable number of uniform and/or different communication modules 212.

The sensor controller 200 can further include a memory (not shown). The memory may include high-speed random access memory (RAM) and may also include non-volatile memory, such as one or more magnetic disk storage devices, flash memory devices, or other non-volatile solid-state memory devices. The memory can be configured to store data transmitted by the sensors 300 to the sensor controller 200 and coded instructions for executing the methods disclosed in the present disclosure.

The processor 211, the communication module 212, and/or the memory can communicate with each other wirelessly and/or over one or more communication buses or signal lines 219.

The mobile platform 100 can further include one or more motors 500 configured to generate a mechanical motion to enable the mobile platform 100 to move. Additionally and/or alternatively, the mobile platform 100 can include one or more motor controllers (not shown). Each motor controller can be coupled with a corresponding motor 500 and/or the main controller 400. The motor controller can be configured to generate a signal for driving the motor 500 based on instructions from the main controller 400.

In general, the main controller 400 can operate the mobile platform 100 based on data generated by the sensors 300. Data generated by the respective sensors 300 can be used individually and/or combined to form sensing results. In general, sensing results can be generated by combining sensor data respectively obtained by multiple sensors, also known as "sensor fusion." For instance, sensor fusion can be used to combine sensor data obtained by different sensor types, including as GPS sensors, inertial sensors, vision sensors, lidar, ultrasonic sensors, and so on. As another example, sensor fusion can be used to combine different types of sensor data, such as absolute measurement data (e.g., data provided relative to a GPS sensor such as GPS sensor data) and relative measurement data (e.g., data provided relative to a local coordinate system such as vision sensing data, lidar data, or ultrasonic sensing data). Sensor fusion can be used to compensate for limitations or inaccuracies associated with individual sensor types, thereby improving the accuracy and reliability of the final sensing result.

Exemplary sensing result can include speed, altitude, acceleration, yaw angle, and/or position of the mobile platform 100. Based on the sensing result, the main controller 400 can instruct the mobile platform 100 to implement various operations. Exemplary operations can include adjusting speed to compensate for deviation from a hovering position, moving toward a certain destination, moving away from an obstacle, and/or the like.

Figure 4:
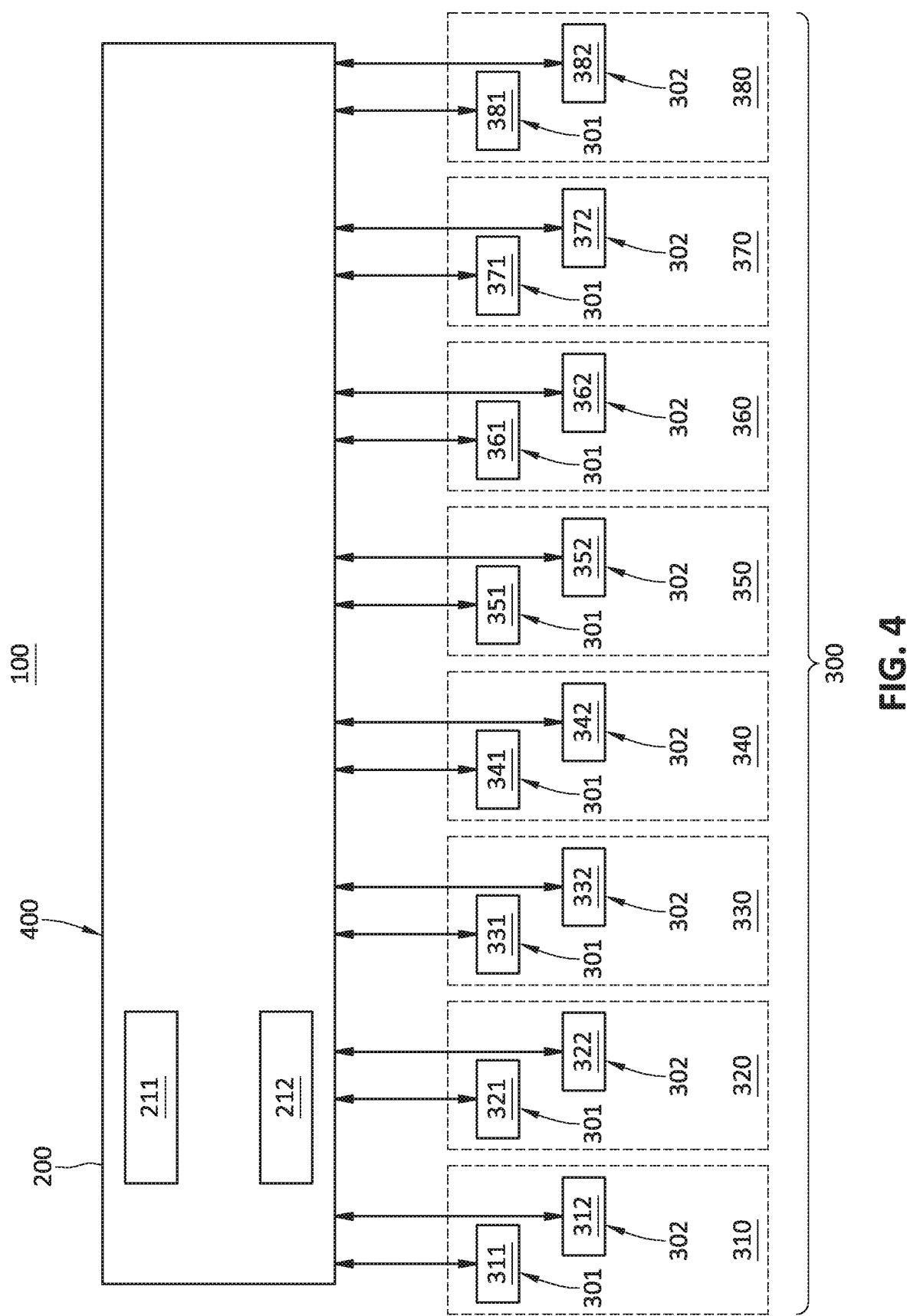
FIG. 4 is an exemplary diagram illustrating another alternative embodiment of the mobile platform of FIG. 1, wherein the sensor controller is coupled with a plurality of sensors.

FIG. 4 is an exemplary diagram illustrating another alternative embodiment of the mobile platform 100 of FIG. 1. As shown illustratively in FIG. 4, the sensors 300 can include sensors 311-382.

The sensors 300 can include GPS sensors 311, 312. The GPS sensors 311, 312 can include a space-based navigation system that provides location, speed and/or time information where there is an unobstructed line of sight to a plurality of GPS satellites.

The sensors 300 can include compasses 321, 322. The compasses 321, 322 can include an instrument used for navigation and orientation that shows direction relative to the geographic cardinal directions. Exemplary compasses 321, 322 can include magnetic compasses.

The sensors 300 can include accelerometers 331, 332. The accelerometers 331, 332 can be configured to measure proper acceleration (and/or "g-force"). Single- and/or multi-axis models of accelerometers can detect magnitude and direction of the proper acceleration as a vector quantity, and can be used to sense orientation (because direction of weight changes), coordinate acceleration (so long as it produces g-force or a change in g-force), vibration, shock, and falling in a resistive medium. Exemplary accelerometers 321, 322 can include 3-axis accelerometers.

In one example, the accelerometers 321, 322 can obtain acceleration of the mobile platform 100. The main controller 400 can be configured to integrate the acceleration to obtain speed and/or position data of the mobile platform 100. Via the sensor fusion process, the main controller 400 can combine such speed and/or position data with speed and/or position data of the mobile platform 100 obtained by the GPS sensors 311, 312, to determine the speed and/or position of mobile platform 100.

The sensors 300 can include gyroscopes 341, 342. The gyroscopes 341, 342 can sense and/or measure pitch, roll and/or yaw attitude angles associated with the mobile platform 100.

In one example, the gyroscopes 341, 342 can obtain a yaw angle of the mobile platform 100. Via the sensor fusion process, the main controller 400 can be configured to combine such yaw angle with a yaw angle measured by the compasses 321, 322, to determine the yaw angle of the mobile platform 100.

The sensors 300 can include altimeters 351, 352. The altimeters 351, 352 can include pressure altimeters and/or barometers. The altimeters 351, 352 can be configured to measure altitude associated with the mobile platform 100. Exemplary altimeters 351, 352 can be configured to ascertain altitude by measuring an atmospheric pressure.

The sensors 300 can include visual odometers 361, 362. The visual odometers 361, 362 can measure position, speed and/or acceleration associated with the mobile platform 100 by capturing, processing, and analyzing image(s) of an object of interest. Exemplary visual odometers 361, 362 can include a single camera and/or a stereo camera.

The sensors 300 can include ultrasound sensors 371, 372. The ultrasound sensors 371, 372 can emit ultrasound waves at high frequency and evaluate an ultrasound echo, which is received back after reflection by an obstacle. Based on time lapse between sending the ultrasound signal and receiving the echo, a distance from the mobile platform 100 to the obstacle can be determined.

The sensors 300 can include lidar 381, 382. The lidars 381, 382 can include an object-detection system that uses ultraviolet, visible, or near infrared light from lasers to determine a range, altitude, direction, and/or speed of objects. Accordingly, the lidars 381, 382 can be configured to obtain altitude, direction, and/or speed of the mobile platform 100.

As shown in FIG. 4, the sensors 311-382 can form a plurality of sensor groups 310-380. The sensors 300 within each sensor group are configured to generate data of the same sensor data type. Each sensor group can include the first sensor 301 and the second sensor 302. For example, as shown in FIG. 4, in the sensor group 320, the accelerometers 331, 332 can each be the first sensor 301 and the second sensor 302, respectively.

The sensors 311-382 are shown in FIG. 4 for illustrative purposes only. Certain sensors 300 may be omitted and other sensors 300 may be included.

Furthermore, certain sensors 300 may be at least partially integrated with other sensors 300. In one example, the accelerometer 321 and/or the gyroscope 341 can be at least partially integrated in a 6-degrees-of-freedom (6-DOF) inertial measurement unit (IMU) (not shown). Thus, the accelerometer 321 of the 6-DOF IMU may belong to the sensor group 320, and the gyroscope 341 of the 6-DOF IMU may belong to the sensor group 340.

In another example, the accelerometer 321 can include three single-axis accelerometers (not shown). The accelerometer 322 can include a single three-axis accelerometer. The accelerometers 321, 322 can generate data of the same sensor data type, which is acceleration data type. Thus, accelerometers 321, 322 can both belong to the sensor group 320.

That is, sensors within each sensor group of the sensor groups 310-380 do not need to be identical sensors. One sensor group may include two sensors configured to generate data of the same sensor data type.

Further, although FIG. 4 shows two sensors as being included in each sensor group of the sensor groups 310-380, more than two sensors can be included in each sensor group of the sensor groups 310-380, without limitation. For example, the sensor group 340 can include one more gyroscope (not shown) besides gyroscopes 341, 342 (not shown).

Figure 5:
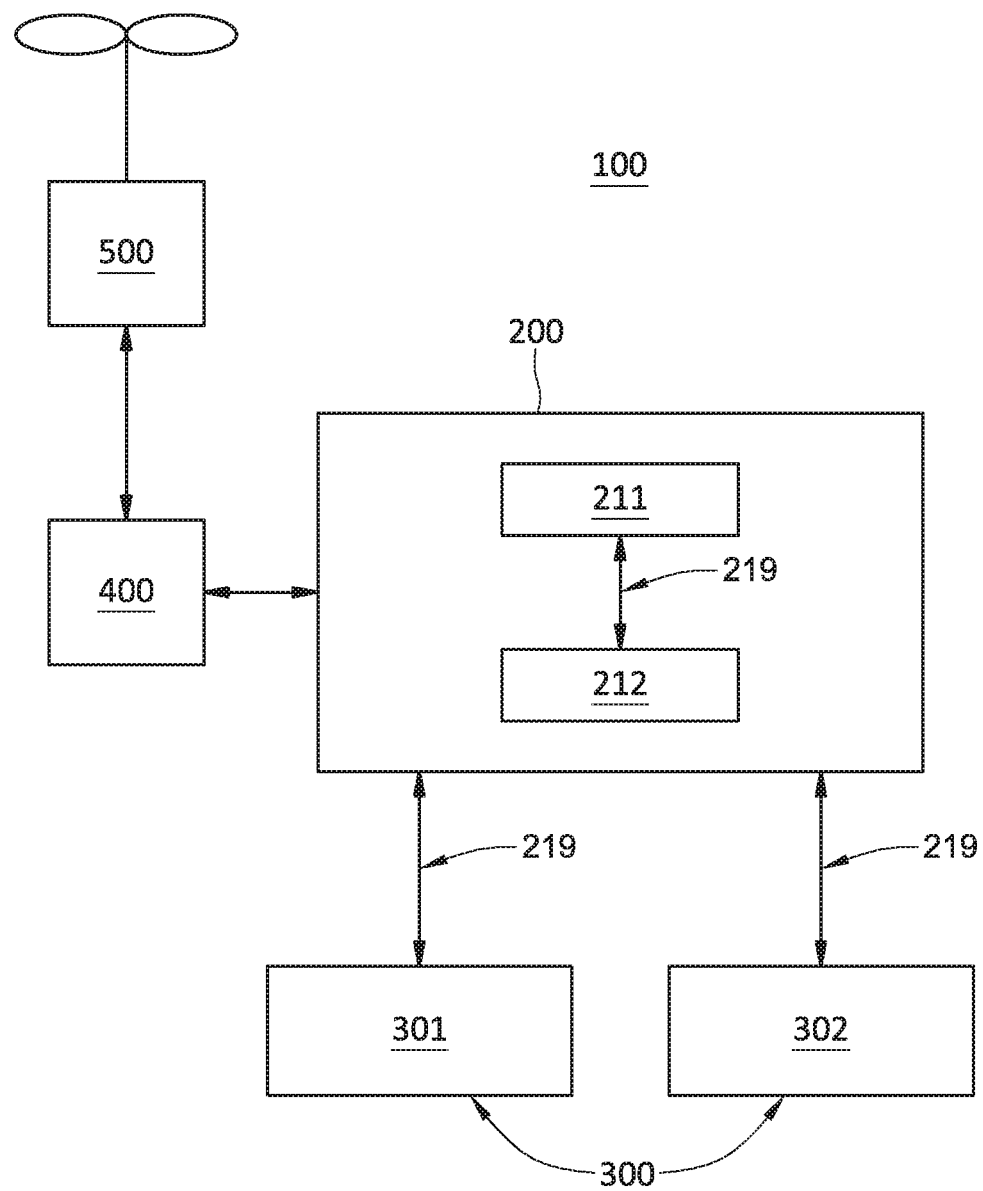
FIG. 5 is an exemplary diagram illustrating another alternative embodiment of the mobile platform of FIG. 1, wherein the sensor controller is configured to send sensor data to a main controller associated with the mobile platform.

FIG. 5 is an exemplary diagram illustrating an alternative embodiment of the mobile platform 100 of FIG. 1, wherein the sensor controller 200 is configured to send sensor data to the main controller 400 associated with the mobile platform 100. In FIG. 5, the sensor controller 200 and the main controller 400 can be at least partially separated and in communication with each other.

The sensor controller 200 can be configured to collected data from the sensors 300. The sensor controller 200 can process the data from the sensors 300 to provide sensor data. 'Sensor data' of a sensor data type can include data representing a corresponding sensor data type, and can include a result of processing the data of the corresponding sensor data type generated by the sensors 300. The sensor controller 200 can transmit such a result to the main controller 400 via the bus 219 and/or the communication module 212, for the main controller 400 to implement the sensor fusion process using the result. The main controller 400 can thus directly use the provided 'sensor data', without a need to determine whether any of the sensors 300 is malfunctioning.

When the sensor controller 200 and the main controller 400 are at least partially integrated (as shown in FIG. 4), the sensor controller 200 can use the 'sensor data' individually and/or process the 'sensor data' in a sensor fusion process, for controlling the mobile platform 100.

FIG. 6 is an exemplary diagram illustrating an alternative embodiment of the mobile platform 100 of FIG. 1, wherein the sensor controller 200 is located remotely from the mobile platform 100. The sensor controller 200 can communicate with the sensors 300 and/or the main controller 400 by wired and/or wireless communication via the communication module 212. Additionally and/or alternatively, the sensor controller 200 can be at least partially integrated with a remote controller (not shown) associated with the mobile platform 100.

Figure 7:
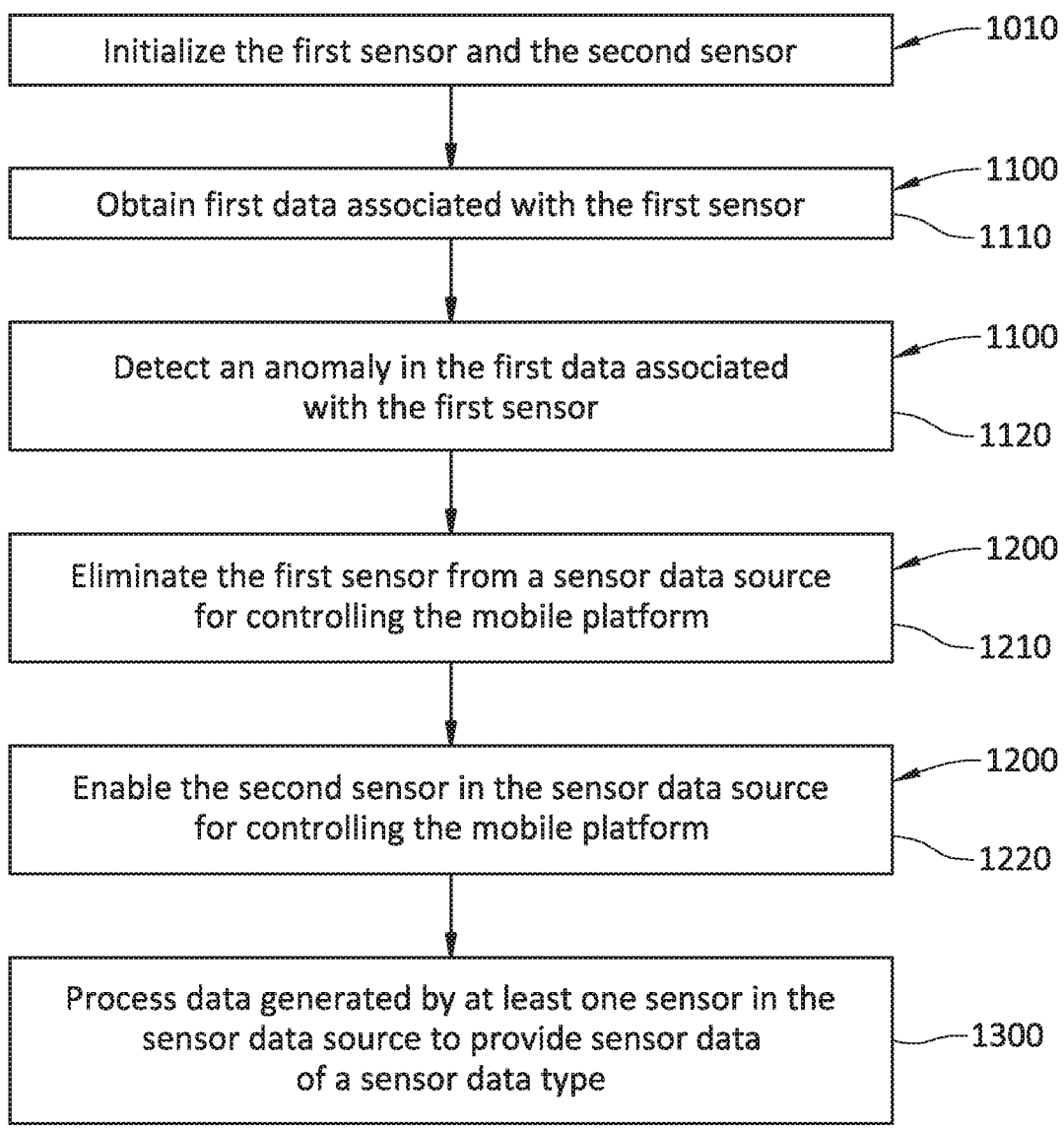
FIG. 7 is an exemplary flow chart illustrating an alternative embodiment of the method of FIG. 2, wherein sensor data of a sensor data type is provided.

FIG. 7 is an exemplary flow chart illustrating an alternative embodiment of the method 1000 of FIG. 2. As shown in FIG. 7, optionally, the first sensor 301 and the second sensor 302 are initialized, at 1010. The sensor controller 200 can be configured to initialize the first sensor 301 and the second sensor 302. During the initialization process, the sensor controller 200 can assign an initial value for a parameter of a sensor 300, and/or obtain initial parameter from the sensor 300. The sensor controller 200 can determine whether communication between the sensor 300 and the sensor controller 200 is functioning. For example, when the sensor controller 200 is not able to receive response from one sensor 300, the sensor controller 200 can determine that the sensor 300 is malfunctioning and data associated with the malfunctioning sensor 300 should not be used for sensor fusion process. The sensor controller 200 can thus switch to a sensor 300 in the same sensor group that includes the malfunctioning sensor 300.

FIG. 4 shows a sensor group as including more than one sensor 300. Advantageously, even if one sensor 300 has a malfunction, the mobile platform 100 may still be operated.

As shown in FIG. 7, detecting the malfunction (shown in 1100 in FIG. 2) can include obtaining first data associated with the first sensor 301. The first data can refer to data generated by the first sensor 301. As shown in FIG. 7, the first data associated with the first sensor 301 can be obtained, at 1110. The sensor controller 200 can be configured to obtain and/or receive the first data from the first sensor 301 via the communication module 212.

Detecting the malfunction (shown in 1100 in FIG. 2) can include detecting an anomaly in the first data associated with the first sensor 301. As shown in FIG. 7, an anomaly in the first data associated with the first sensor 301 can be detected, at 1120. The sensor controller 200 can be configured to detect the anomaly in the first data.

Figure 8:
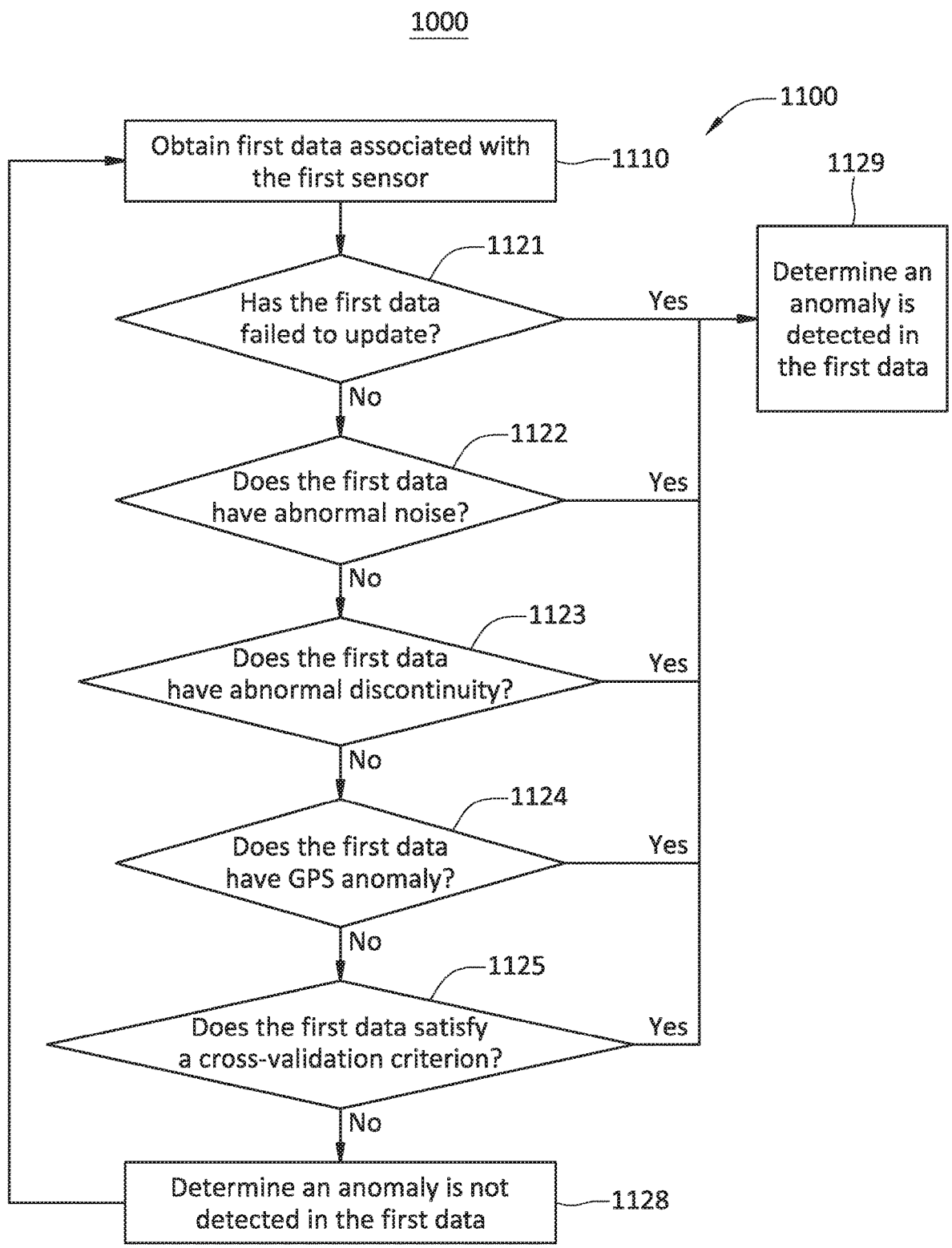
FIG. 8 is an exemplary flow chart illustrating another alternative embodiment of the method of FIG. 2, wherein the method includes detecting an anomaly in first data provided by a first sensor.

FIG. 8 is an exemplary flow chart illustrating another alternative embodiment of the method 1000 of FIG. 2. FIG. 8 shows an exemplary process for detecting the anomaly in the first data. As shown in FIG. 8, the first data associated with the first sensor 301 are obtained, at 1110. The sensor controller 200 can evaluate the first data, at 1121-1125, against one or more anomaly criteria.

The sensor controller 200 can be configured to determine, at 1121, whether the first data has failed to update. For example, when the first data has remained constant during a predetermined time interval, the sensor controller 200 can determine that the first data has failed to update. When the first data has failed to update, the sensor controller 200 can be configured to determine, at 1129, that the anomaly is detected, and/or exists, in the first data. When the first data has not failed to update, the sensor controller 200 can be configured to determine that the anomaly is not detected in the first data and evaluate the first data based on further criteria. Stated somewhat differently, the detecting of the anomaly can include detecting that the first data has remained constant during a predetermined time interval.

When the first sensor 301 malfunctions, the first data may have one or more anomalies therein. One exemplary anomaly of the first data is the failure to update. For example, the accelerometer 331 (shown in FIG. 4) can be made of a small micro electro-mechanical system (MEMS), and can include a cantilever beam with a proof mass (also known as seismic mass). When the accelerometer 331 experiences a mechanical impact, the microelectronic structure inside the MEMS chip can be damaged. Additionally and/or alternatively, communication between the accelerometer 331 and the sensor controller 200 can be disconnected. Thus, the first data from the accelerometer 331 can fail to update and/or may provide the same acceleration value to the sensor controller 200 over a time interval.

The predetermined time interval can be any suitable time interval defined prior to detecting of the anomaly. The sensor controller 200 can be configured to use the predetermined time interval for evaluating the first data. For example, the predetermined time interval can be in a unit of clock tick. In a non-limiting example, the predetermined time interval can be 20 clock ticks for a computer system clock running at 66 MHz.

The sensor controller 200 can be configured to determine, at 1122, whether the first data has abnormal noise. For example, when noise associated with the first data is greater than a predetermined noise level, the sensor controller 200 can determine that the first data has abnormal noise. When the first data has abnormal noise, the sensor controller 200 can be configured to determine, at 1129, that the anomaly is detected, and/or exists, in the first data. When the first data has no abnormal noise, the sensor controller 200 can be configured to determine that the anomaly is not detected in the first data and evaluate the first data based on further criteria. Stated somewhat differently, the detecting of the anomaly can include detecting that the noise associated with the first data is greater than the predetermined noise level.

One exemplary anomaly of the first data is the abnormal noise. For example, the altimeter 351 (shown in FIG. 4) can be made of MEMS. When the altimeter 351 experiences a mechanical impact, the microelectronic structure inside the MEMS chip can be damaged which can cause the first data from the altimeter 351 to have abnormally high noise. For example, the altimeter 351 can have a noise level below 1 meter when functioning normally, so noise ranging from 8 meters to 9 meters can be abnormally high. When the abnormal noise in the first data is used by the main controller 400 as normal data, the UAV may react by significantly changing altitude, resulting in unstable operation.

The predetermined noise level can be any suitable noise level defined prior to detecting of the anomaly and based on normal noise level of the first data. The sensor controller 200 can be configured to use the predetermined noise level for evaluating the first data. In a non-limiting example, the predetermined noise level for the altimeter 351 can be 1 meter.

The sensor controller 200 can be configured to determine, at 1123, whether the first data has abnormal discontinuity. For example, when discontinuity in the first data that is greater than a predetermined discontinuity level, the sensor controller 200 can determine that the first data has abnormal discontinuity. When the first data has abnormal discontinuity, the sensor controller 200 can be configured to determine, at 1129, that the anomaly is detected, and/or exists, in the first data. When the first data has no abnormal discontinuity, the sensor controller 200 can be configured to determine that the anomaly is not detected in the first data and evaluate the first data based on further criteria. Stated somewhat differently, the detecting of the anomaly can include detecting that the discontinuity in the first data that is greater than a predetermined discontinuity level.

One exemplary anomaly of the first data is the abnormal discontinuity. For example, when the altimeter 351 starts to malfunction when the UAV is at an altitude of 150 m, the altimeter 351 may generate the first data associated with an altitude of 1000 m. Such a discontinuity can indicate the first data has an anomaly.

The predetermined discontinuity level can be any suitable discontinuity level defined prior to detecting of the anomaly and based on normal discontinuity level of the first data. The sensor controller 200 can be configured to use the predetermined noise level for evaluating the first data.

When the first sensor 301 includes a GPS sensor (for example, the first GPS sensor 311), the sensor controller 200 can be configured to determine, at 1124, whether the first data has a GPS anomaly. For example, when the first data indicates loss of a satellite signal with the first GPS sensor 311, the sensor controller 200 can determine that the first data has the GPS anomaly. Additionally and/or alternatively, when the first data has inconsistency between respective changes of a location and a speed of the mobile platform 100 according to the first GPS sensor 311, the sensor controller 200 can determine that the first data has the GPS anomaly.

When the first data has the GPS anomaly, the sensor controller 200 can be configured to determine, at 1129, that the anomaly is detected, and/or exists, in the first data. When the first data does not have the GPS anomaly, the sensor controller 200 can be configured to determine that the anomaly is not detected in the first data and evaluate the first data based on further criteria. Stated somewhat differently, when the first sensor 301 includes the first GPS sensor 311, the detecting of the malfunction and/or the anomaly can include detecting the GPS anomaly including the loss of the satellite signal with the first GPS sensor 311, and/or the inconsistency between respective changes of a location and a speed of the mobile platform 100 according to the GPS sensor.

One exemplary anomaly of the first data associated with the first GPS sensor 311 can include the GPS anomaly. For example, when the mobile platform 100 is at a position without sufficient satellite signal, the first data from the first GPS sensor 311 may be inaccurate.

Further, when the first GPS sensor 311 provides position change that is inconsistent with speed change, the first GPS sensor 311 may be malfunctioning. For example, when the first GPS sensor 311 indicates the position of the UAV has moved toward the west within a time interval of two seconds, while the speed of the UAV is in an eastward direction within the same time interval, the first data has the inconsistency between respective changes of the location and the speed of the mobile platform 100. Such GPS anomaly may result in the mobile platform 100 moving toward a wrong direction, which can lead to hazardous outcome such as a collision.

The inconsistency can be determined based on any suitable type of inconsistency criteria defined prior to detecting of the anomaly. The sensor controller 200 can be configured to use the inconsistency criteria for evaluating the first data.

The sensor controller 200 can be configured to determine, at 1125, whether the first data satisfies a cross-validation criterion. The cross-validation criterion can include one or more rules for determining whether the first data has the anomaly via comparing the first data with data from sensors 300 other than the first sensor 301.

When the first data satisfies the cross-validation criterion, the sensor controller 200 can be configured to determine, at 1129, that the anomaly is detected, and/or exists, in the first data. When the first data does not satisfy the cross-validation criterion, the sensor controller 200 can be configured to determine that the anomaly is not detected in the first data and evaluate the first data based on further criteria. Stated somewhat differently, the detecting of the anomaly can include detecting that the first data satisfies the cross-validation criterion.

The cross-validation criterion can be determined prior to detecting of the anomaly based on relationship between data of uniform and/or different sensors 300.

In one example, the cross-validation criterion can include that the first data are inconsistent with respective data associated with a third sensor and a fourth sensor each being associated with the mobile platform 100. Additionally and/or alternatively, the cross-validation criterion can include that the data associated with the third sensor is in agreement with the data associated with the fourth sensor. In other words, when the first data is inconsistent with two or more other sensors 300, the first data can have an anomaly.

In a non-limiting example, the first data associated with the first compass 321 indicates a significant change in yaw angle of the UAV, such as 70 degrees, while both of the gyroscopes 341, 342 indicate a small change in yaw angle of the UAV, such as 30 degrees. Because the probability of both gyroscopes 341, 342 malfunctioning at the same time while generating the same yaw angle is very low, the sensor controller 200 can be configured to determine that the gyroscopes 341, 342 are both functioning and that the first data of the first compass 321 has the anomaly.

In another non-limiting example, the first data associated with the first compass 321 indicates a significant change in yaw angle of the UAV, such as 70 degrees, while the second compass 322 and the gyroscope 341 indicate a small change in yaw angle of the UAV, such as 30 degrees. Because the probability of both of the second compass 322 and the gyroscope 341 malfunctioning at the same time while generating the same yaw angle is very low, the sensor controller 200 can be configured to determine that the second compass 322 and the gyroscope 341 may be both functioning the first data of the first compass 321 has the anomaly.

Therefore, according to the cross-validation criterion, the first data are of a first sensor data type. As illustrated in the two exemplary cases above, the first data are of the compass data type, and/or the yaw angle data type.

Additionally and/or alternatively, data associated with at least one of the third sensor and the fourth sensor are of a second sensor data type. The second sensor data type can be different from the first sensor data type. That is, sensors 300 involved in the cross-validation criterion do not necessarily provide data of the same sensor data type as the first data. As illustrated in the two exemplary cases above, when the first data associated with the first compass 321 are of the compass data type, data associated with the gyroscope 341 may be of the gyroscope data type, which can be different from the compass data type.

To further illustrate the cross-validation criterion, another example is shown as follows. The first data associated with the first visual odometer 361 indicates a first measured altitude of the UAV, while both of the altimeters 351, 352 indicate a second measured altitude of the UAV which is different from the first measured altitude. Because the probability of both altimeters 351, 352 malfunctioning at the same time while generating the same measured altitude is very low, the sensor controller 200 can be configured to determine that the altimeters 351, 352 are both functioning and that the first data of the first visual odometer 361 has the anomaly. On the other hand, the sensor controller 200 can detect a malfunction in the first altimeter 351 by comparing the data of the first altimeter 351 with data from the visual odometers 361, 362.

In the above case, the first data are inconsistent with respective data associated with the third sensor and the fourth sensor for ascertaining an altitude of the mobile platform. The first data associated with the first sensor and the data associated with the third sensor being one of altimeter data type and visual odometer data type, respectively. That is, data of the first sensor can be of altimeter data type, data of the third sensor can be of visual odometer data type. Alternatively, data of the first sensor can be of visual odometer data type, data of the third sensor can be of altimeter data type. The fourth sensor can generate data of altimeter data type and/or visual odometer data, without limitation.

In general, an altimeter can include a barometer for ascertaining altitude by measuring an atmospheric pressure, and thus may need to operate in an environment with measurable atmospheric pressure. A visual odometer installed on the mobile platform 100 can ascertain altitude by capturing and analyzing one or more images of an object on the ground. Additionally and/or alternatively, the visual odometer installed on the ground can ascertain altitude by capturing and analyzing one or more images of an object on the mobile platform 100. Therefore, to operate the visual odometer, the altitude of the mobile platform 100 may not reach an altitude limit. An altitude limit can be similar to an altitude of the stratosphere, and/or range from 8 km and 18 km.

Accordingly, to detect the malfunction by comparing data of the visual odometers 361, 362 with data of altimeters 351, 352 using the cross-validation criterion at 1125 in FIG. 8, the mobile platform 100 may need to operate in a special condition where both of a visual odometer and an altimeter may function. As described previously, an exemplary special condition includes an altitude lower than stratosphere and a measurable atmospheric pressure. Among different types of mobile platforms 100, a UAV may operate in such a special condition while other types of mobile platforms 100 may not. Therefore, not all types of mobile platforms 100 can have a feature of comparing data of the visual odometers 361, 362 with data of altimeters 351, 352 using the cross-validation criterion at 1125.

In another example, the cross-validation criterion can include that the first data are inconsistent with data associated with a third sensor associated with the mobile platform 100. In other words, when the first data is inconsistent with data associated with another sensor 300, the first data can have an anomaly.

For example, the first data of the accelerometer 331 has remained constant during a time interval. In contrast, the accelerometer 332 has data updated during the same time interval. The first data can thus be inconsistent with the data associated with the sensor 332, the sensor controller 200 can be configured to determine that the first data has the anomaly.

The sensor controller 200 can be configured to evaluate the first data using one or more suitable cross-validation criteria, without limitation. Each of the cross-validation criteria can be based on a relationship between multiple sensors 300. A sensor 300 functioning normally can provide data to validate and/or invalidate the first data of the first sensor 301.

Additional and/or additional criteria can be included, without limitation. According to an exemplary criterion (not shown), the sensor controller 200 can detect the anomaly in the first data by detecting that the first data is below and/or over a limit based on capability and/or specification of the mobile platform 100. For example, the accelerometer 331 can generate the first data indicating an acceleration of the mobile platform 100 to be at 16 gravitational acceleration, i.e., a gravitational acceleration multiplied by 16. The 'gravitational acceleration' can refer to an acceleration on an object caused by force of gravity. An exemplary value of the gravitational acceleration can be 9.8 m/s'. The mobile platform 100 may not be able to reach 16 gravitational acceleration at full acceleration in normal operation. In that case, the sensor controller 200 can be configured to determine that the accelerometer 331 has the anomaly, by detecting the first data to be exceedingly large. The upper limit of the first data can be determined in any manners, without limitation.

The criteria 1121-1125 are exemplary only. Sequence of the criteria 1121-1125 can be altered, without limitation. Further, certain criteria can be omitted and other criteria can be included. In addition, the criteria 1121-1125 can be uniform and/or different for each sensor group, and/or for each individual sensor 300. That is, two different sensor groups can have different criteria. That is, two individual sensors 300 associated with the same and/or different sensor data type can be evaluated against different criteria for detecting the anomaly.

In FIG. 8, when the sensor controller 200 determines, at 1128, that the anomaly is not detected in the first data, the sensor controller 200 can optionally continue to obtain new first data from the first sensor (shown in 1110).

Referring back to FIG. 7, after detecting the malfunction in the first sensor 301, the first sensor 301 is eliminated, at 1210, from a sensor data source for controlling the mobile platform 100. In other words, the switching to the second sensor 302 (shown in 1200 in FIG. 2) can include eliminating the first sensor from a sensor data source for controlling the mobile platform 100.

As previously described, the sensor data source can refer to a list that can at least partially identify sensors 300 that are not malfunctioning. In other words, the sensors 300 in the sensor data source are detected by the sensor controller 200 to be malfunctioning. The sensor data source can be stored as a file and/or data stored at one or more memory address in a memory (now shown) associated with the sensor controller 200.

Additionally and/or alternatively, the sensor data source does not necessarily have an address and/or location in the memory. The sensor controller 200 can be configured to, in any other conventional manners, keep track of the sensors 300 that are not malfunctioning, and/or the sensors 300 that are malfunctioning. In that case, equivalently, the sensor data source can be maintained and/or updated without necessarily being stored as a specific memory address.

Figure 9:
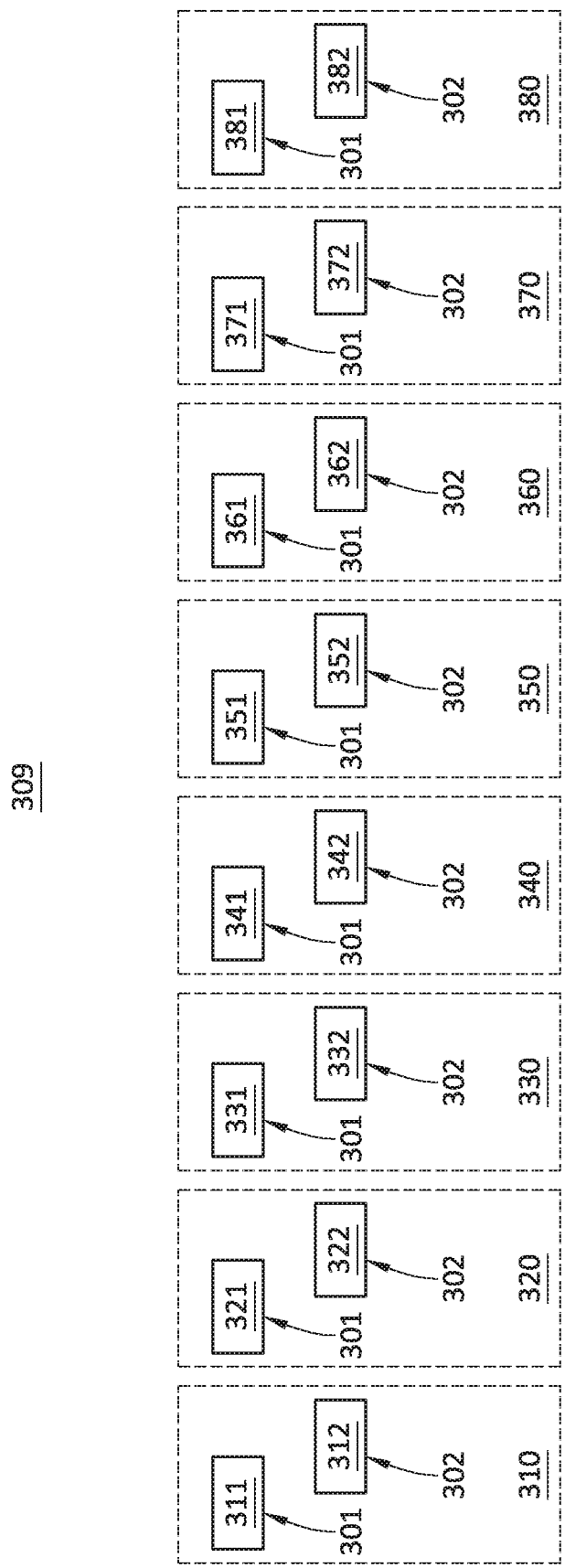
FIG. 9 is an exemplary diagram illustrating an embodiment of a sensor data source prior to detecting a malfunction in a first sensor according to the method of FIG. 2.

FIG. 9 is an exemplary diagram illustrating an embodiment of a sensor data source 309 prior to detecting a malfunction in the first sensor 301 according to the method 1000 of FIG. 2. For illustrative purposes, sensors 311-382 (shown in FIG. 4) are assumed to be functioning normally, and are thus included in the sensor data source 309.

Figure 10:
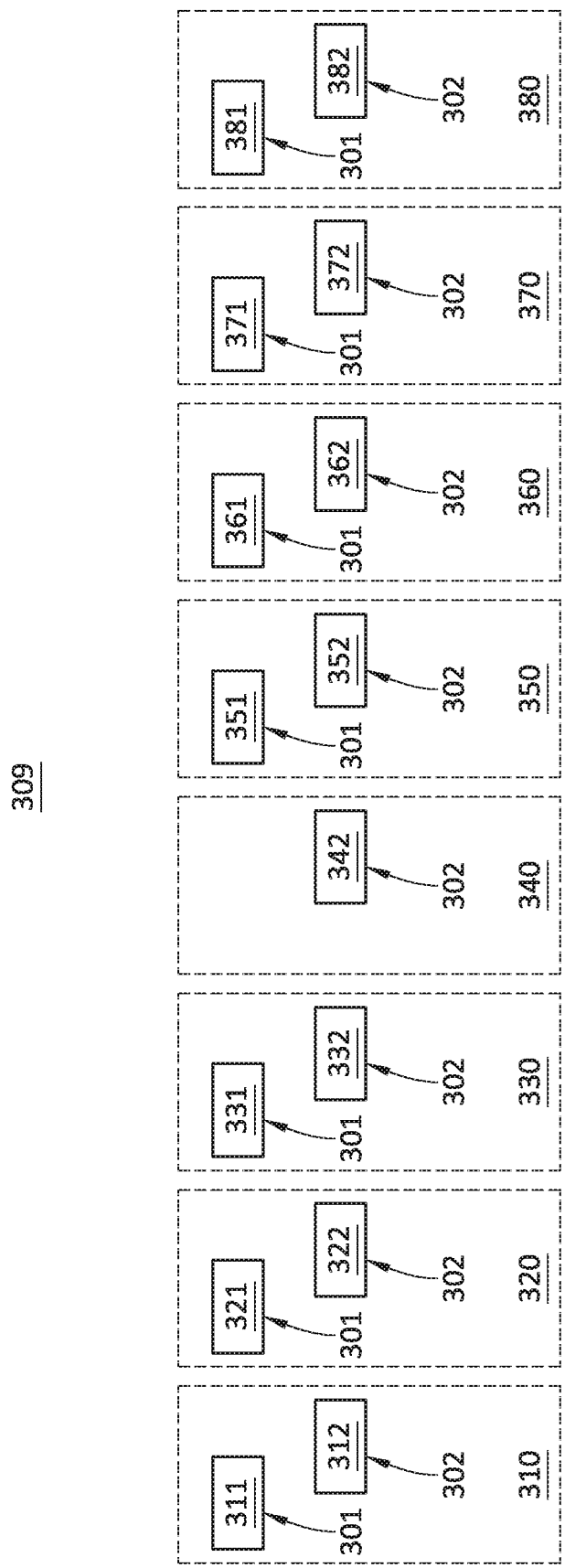
FIG. 10 is an exemplary diagram illustrating an embodiment of the sensor data source of FIG. 9 after detecting the malfunction in the first sensor according to the method of FIG. 2.

FIG. 10 is an exemplary diagram illustrating an embodiment of the sensor data source 309 of FIG. 9 after detecting a malfunction in the first sensor 301 according to the method 1000 of FIG. 2. In the example shown in FIG. 10, the first sensor 301 of the sensor group 340, i.e., the gyroscope 341, is detected by the sensor controller 200 to have a malfunction. The sensor controller 200 can thus eliminate and/or exclude the gyroscope 341 from the sensor data source 309. The sensor data source 309 thus does not include the gyroscope 341.

The sensor controller 200 can previously use the first data generated by the first sensor 301 as data for controlling the mobile platform 100. Upon detecting the malfunction of the first sensor 301, the sensor controller 200 can use data generated by the second sensor 302 for controlling the mobile platform 100. Referring back to FIG. 7, the second sensor 302 can be enabled, at 1220, to be in the sensor data source for controlling the mobile platform 100. In other words, the switching to the second sensor 302 can include enabling the second sensor 302 to be in the sensor data source 309 for controlling the mobile platform 100.

In the example of FIGS. 9-10, the second sensor 302 can be in the sensor data source 309 and generate data before the first sensor 301 is detected to be malfunctioning. However, at that time, the sensor controller 200 may or may not use the data generated by the second sensor 302. Upon detecting the malfunction of the first sensor 301, the sensor controller 200 can use the data generated by the second sensor 302 instead of the data generated by the first sensor 301, in order to generate the sensor data of the sensor data type for controlling the mobile platform 100.

For example, in FIG. 10, after the sensor controller 200 eliminates the gyroscope 341 from the sensor data source 309, the sensor controller 200 can enable the second sensor 302 in the sensor group 340, i.e., the gyroscope 342 for controlling the mobile platform 100. In other words, data associated with the second sensor 302 can be used for controlling the mobile platform 100.

By eliminating and/or excluding the first sensor 301 upon detecting a malfunction in the first sensor 301, the sensor controller 200 can ensure that operation of mobile platform 100 can be determined based on correct data. According to failure analysis of many UAV accidents, such as UAV crashing, a significant percentage of accidents are due to abnormal functioning of sensors 300, rather than errors in data processing algorithm of UAV main controller 400. Sometimes, malfunction of one sensor can cause error in sensor fusion. The error can lead to an operation of the UAV that reacts incorrectly to the surrounding conditions and results in crashing and/or collisions. Therefore, sensor redundancy is advantageous for preventing accidents and improving safety of UAV operations.

Furthermore, optionally, after detecting the malfunction in the first sensor 301 using the method 1000 in FIG. 8, the sensor controller 200 can be configured to continue receiving first data from the first sensor 301 and evaluating the first data, even though the first sensor 301 may be excluded from the sensor data source and not used for controlling the mobile platform 100. The first data can be evaluated using the method 1000 in FIG. 8. When the sensor controller is not able to detect any anomaly in the first data, the first sensor 301 may be restored back into the sensor data source 309. Advantageously, the first sensor 301 can be fully utilized when the malfunction is temporary.

Additionally and/or alternatively, at 1200 shown in FIG. 7, the second sensor 302 being switched to be associated with a lower probability of having the malfunction than the first sensor 301. The sensors 301, 302 may have different susceptibilities to an environment and/or usage condition, respectively. That is, the sensor control 200 can select the second sensor 302 that is, relative to the first sensor 301, affected by the cause of the malfunction differently.

For example, a UAV may experience two or more different environments during one trip. The changing in environment may not be completely predictable by a user and/or the sensor control 200. For example, the changing in environment may due to changing of weather at a same location, and/or changing of travel route for avoiding unexpected hazardous event. The first sensor 301 may be less likely to have a malfunction than the second sensor 302 in a first environment. Thus, the sensor control 200 uses data from the first sensor 301. However, the first sensor 301 may be more likely to have a malfunction than the second sensor 302 in a second environment. When the environment changes to the second environment unexpectedly, and/or when the sensor controller 200 is not aware of the change, the sensor controller 200 continues to use the data provided by the first sensor 301 until detecting the malfunction. To improve accuracy of data in such a case, based on the detected malfunction of the first sensor 301, the sensor control 200 may select the second sensor 302 less likely to have the malfunction and use the second sensor 302 in place of the first sensor 301.

Stated somewhat differently, when the sensor 301 has the malfunction, a mechanism causing the malfunction may affect the sensor 302 differently so that the sensor 302 may not have the malfunction and/or may have the malfunction to a less extent. In other words, in a certain environment and/or usage condition, the second sensor 302 can be associated with a lower probability of having the malfunction than the first sensor 301.

Each sensor groups 310-390 as shown in FIG. 4 can include more than two sensors. At least one of the sensor groups 310-390 can have a triple redundancy, quadruple redundancy, and/or a redundancy of a higher order. Thus, upon detecting a malfunction in the second sensor 302, the sensor controller 200 can be configured to switch to a third sensor (not shown). Upon detecting a malfunction in the third sensor, the sensor controller 200 can be configured to switch to a fourth sensor (not shown). Stated somewhat differently, upon detecting a malfunction in one sensor, the sensor controller 200 can be configured to switch to a next sensor selected in the group.

Therefore, upon detecting the malfunction in the first sensor 301, the sensor controller 200 may be configured to select the second sensor 302 to which to switch. When the sensor group associated with the sensor 301 includes the sensor 302 as the only other sensor, the sensor controller 200 can be configured to select the sensor 302. However, in some cases, the sensor group associated with the sensor 301 can include two or more other remaining sensors. To select the sensor 302, the sensor controller 200 can be configured to select a sensor associated with a lower probability of having the malfunction than the first sensor 301. Additionally and/or alternatively, to select the sensor 302, the sensor controller 200 can be configured to select a sensor associated with a lowest probability of having the malfunction among all the remaining sensors in the sensor group.

For example, GPS sensors 311, 312 may be subject to a multipath effect. The multi-path effect can refer to a propagation phenomenon that results in a wireless telecommunication signal reaching a receiving antenna by two or more paths. The multi-path effect can be generally caused by the wireless telecommunication signal bouncing off an object such as a mountain, a building, and/or the like. In the first GPS sensor 311, the multipath effect can result in the GPS sensors 311, 312 output data to inaccurately indicate that the first GPS sensor 311 is randomly jumping or creeping, degrading accuracy of the position and/or the speed of the first GPS sensor 311.

The GPS sensors 311, 312 may be configured to have different susceptibilities to the multipath effect at a selected position. For example, the first GPS sensor 311 may be associated with a first antenna. The GPS sensor 312 may be associated with a second antenna having a different multipath resistance from the first antenna. Exemplary GPS antennas can include Quad Helix antenna, Patch antenna, spiral helices antenna, microstrip antenna, planar rings (and/or "choke ring") antenna, and/or the like. Different antennas can have respective multipath-resistances. The sensor controller 200 can be configured to retrieve information from the memory on the respective antennas associated with the GPS sensors 311, 312 and the multipath-resistances thereof. When the first GPS sensor 311 generates the first data that has jumping and/or creeping, the malfunction may indicate the effect of the multipath effect. The sensor controller 200 can select the GPS sensor having a greater multipath-resistance than the first GPS sensor 311 as the second GPS sensor 312. Additionally and/or alternatively, the sensor controller 200 can select the GPS sensor having the greatest multipath-resistance as the second GPS sensor 312.

Additionally and/or alternatively, at a position surrounded by objects such as buildings, the GPS sensors 311, 312 may lose the satellite signal because the satellite signal may block the satellite signal from the building. The GPS sensors 311, 312 may be positioned apart by a pre-determined distance on the UAV. The pre-determined distance can be determined by the sensor controller 200 based on a fixed value and/or based on density of surrounding objects, height of the UAV, and/or any other suitable factors. An exemplary pre-determined distance can range from 10 cm to 30 cm. When the first GPS sensor 311 loses a satellite signal and generates inaccurate data, the sensor controller 200 can select a GPS sensor located away from the first GPS sensor 311 by the pre-determined distance as the second GPS sensor 312. By being positioned away from the first GPS sensor 311, the second GPS sensor 312 may be able to receive a signal from at least one more satellite that the first GPS sensor 311. Additionally and/or alternatively, the sensor controller 200 can select the GPS sensor that is the farthest away from the first GPS sensor 311 as the second GPS sensor 312.

In another example, the compasses 321, 322 can function normally in the Earth's magnetic field. The compasses 321, 322 may be subject to malfunctions caused by a disturbance in the magnetic field. For example, the UAV may enter a vicinity of an iron mine. The iron mine can generate a disturbance in the magnetic field. The disturbance can be localized within the vicinity of the iron mine. The first compass 321 can generate data indicating a large shift of the yaw angle due to the disturbance in the magnetic field, even though the orientation of the UAV has not changed. Additionally and/or alternatively, under certain circumstances, the motor 500 (shown in FIGS. 3 and 5-6) can have a magnetic flux leakage. That is magnetic flux generated by inner workings of the motor 500 leaks out of a casing for shielding the magnetic flux. The first compass 321 can generate data indicating a large shift of the yaw angle under the disturbance in the magnetic field within the vicinity of the motor 500, even though the orientation of the UAV has not changed. Thus, the disturbance in the magnetic field can result in a malfunction of the first compass 321.

The compasses 321, 322 may be positioned apart by a pre-determined distance on the UAV. The pre-determined distance can be determined by the sensor controller 200 based on a fixed value. An exemplary pre-determined distance can range from 10 cm to 30 cm. When the sensor controller 200 detects the malfunction in the first compass 321 such as the large shift of the yaw angle, the sensor controller 200 can be configured to select a compass located away from the first compass 321 by the pre-determined distance as the second compass 322. The sensor controller 200 can be configured to retrieve information from memory on the respective positions associated with the compasses 321, 322 to enabling selection of the second compass 322. As the disturbance in the magnetic field can fade exponentially, the second compass 322 positioned away from the first compass 321 may be affected by the disturbance in the magnetic field to a negligible extent and thus can function normally.

Additionally and/or alternatively, the sensor controller 200 can select the compass farther away from the ground than the first compass 321. Thus, the disturbance in the magnetic field by the iron mine can disturb the second compass 322 less than the first compass 321. For example, when the UAV is flying above the ground and in the vicinity of the iron mine, when the UAV is oriented horizontally with a bottom of the UAV facing the ground. When the sensor controller 200 detects the malfunction of the first compass 321 positioned at the bottom of the UAV, the sensor controller 200 can select a compass positioned at the top of the UAV as the second compass 322.

Additionally and/or alternatively, the sensor controller 200 can select the compass farther away from a selected motor 500 than the first compass 321. Thus, the disturbance in the magnetic field due to the magnetic flux leaking from a selected motor 500 can disturb the second compass 322 less than the first compass 321. For example, when the sensor controller 200 detects the malfunction of the first compass 321 positioned closer to a selected motor 500 than other compasses, the sensor controller 200 can be configured to select a compass positioned farther from the selected motor 500 as the second compass 322.

Additionally and/or alternatively, the sensor controller 200 can select a compass positioned farthest away from the first compass 321, the selected motor 500, and/or the ground, without limitation.

In still another example, the first and second sensors 301, 302 are not necessarily both positioned on the mobile platform 100 (shown in FIG. 1). For example, the first visual odometer 361 can be installed onboard the mobile platform 100. The second visual odometer 362 can be positioned remotely from the mobile platform 100. For example, the second visual odometer 362 can be positioned on the ground at a stationary position. In that case, the second visual odometer 362 can be at least partially integrated with the remote controller (not shown). When the mobile platform 100 operates in a harsh environment in air that causes a malfunction in the first visual odometer 361, the sensor controller 200 can be configured to switch to the second visual odometer 362 to measure the position and/or speed of the mobile platform 100 by capturing images of the mobile platform 100.

Referring back to FIG. 7, data generated by at least one sensor 300 in the sensor data source 309 are processed, at 1300, to provide sensor data of a sensor data type. In the example shown in FIGS. 9-10, each of the sensor groups 310-390 can generate data of a respectively sensor data type. Each of the sensor groups 310-390 can include one or more sensors 300. The sensor controller 200 can be configured to process data generated by one or more sensors 300 in each of the sensor groups 310-390 to provide the sensor data of the corresponding sensor data type. For example, assuming both of the GPS sensors 311, 312 are in the data source 309, in order to provide sensor data of the GPS sensor data type, the sensor controller 200 can process the data generated by the GPS sensors 311, 312, to generate the sensor data as the final sensing result of GPS sensors 311-312.

Although FIG. 7 illustrates 1300 as following 1200, the sensor controller 200 can be configured to process data at any time and implement 1300 before, during, and/or after 1100, 1200 shown in FIGS. 2 and 7, without limitation.

Figure 11:
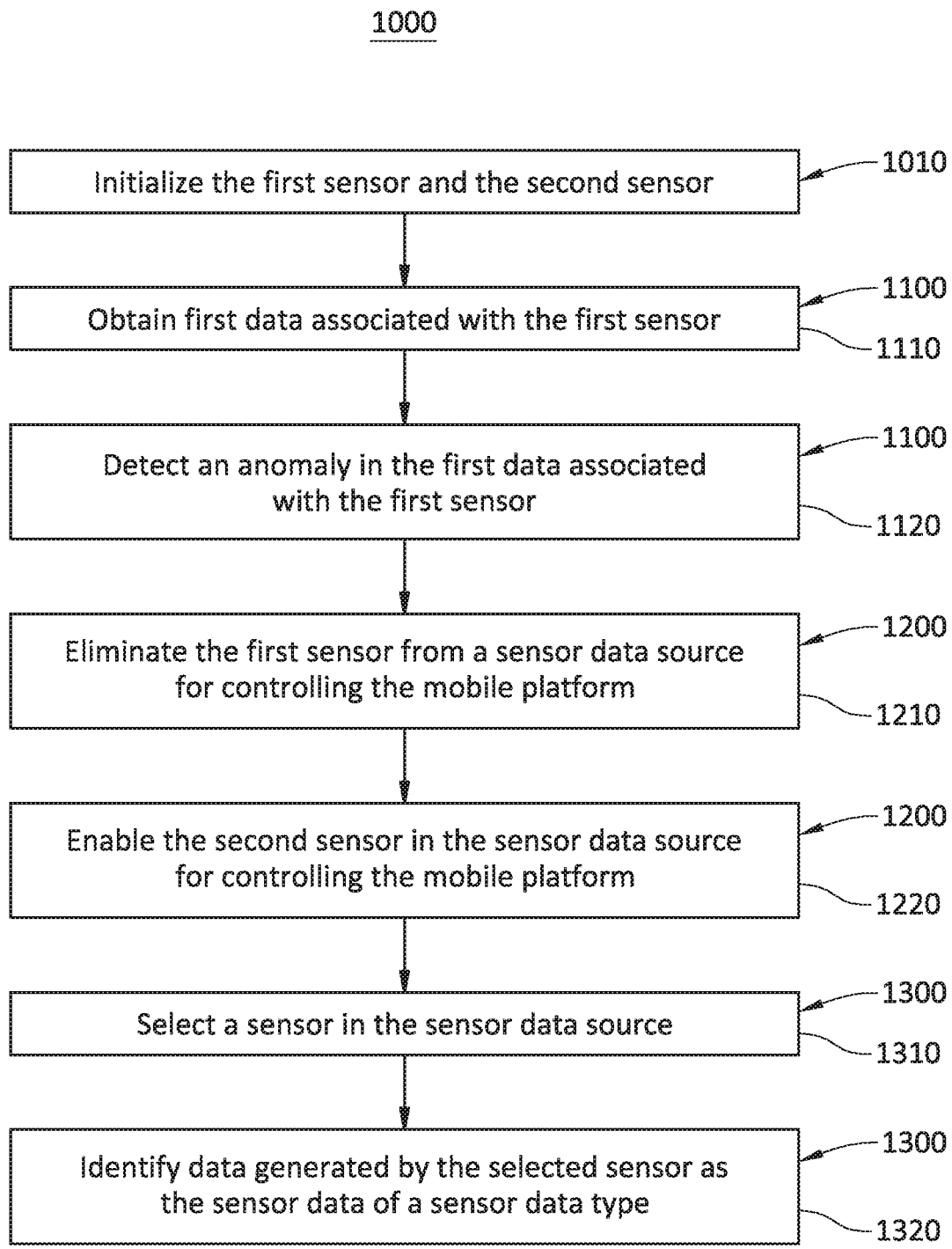
FIG. 11 is an exemplary flow chart illustrating another alternative embodiment of the method of FIG. 7, wherein a sensor in the sensor data source is selected.

The sensor controller 200 can be configured to process the data generated by the sensors 300 of each sensor group in any suitable manners. FIG. 11 is an exemplary flow chart illustrating another alternative embodiment of the method of FIG. 7, wherein the method 1000 includes selecting a sensor 300 in the sensor data source 309 (shown in FIGS. 9-10). As shown in FIG. 11, a sensor 300 can be selected, at 1310, in the sensor data source 309. The sensor controller 200 can selected a sensor 300 from a sensor group that corresponds to a sensor data type of interest. For example, assuming both of the GPS sensors 311, 312 are in the data source 309 (shown in FIG. 10), in order to provide GPS sensor data of the GPS sensor data type, the sensor controller 200 can select one of the GPS sensors 311, 312.

Data generated by the selected sensor 300 is identified, at 1320, as the sensor data of the sensor data type. For example, the sensor controller 200 can select the first GPS sensor 311 at 1310. Thus, the sensor controller 200 can identify data generated by the first GPS sensor 311 as the sensor data of the GPS sensor data type. The data generated by the first GPS sensor 311 can thus be used as the final GPS sensing result to be used for sensor fusion and/or for controlling the mobile platform 100.

In some cases, one or more sensors 300 in a sensor group may be assigned uniform and/or different weights. The weight can refer to a statistical weight used for calculation. The sensor controller 200 can be configured to process the data generated by the sensors 300 within a sensor group according to the weights.

For example, in a sensor group in the sensor data source, two sensors can be associated with respective weights and configured to generate data of the sensor data type. The sensor controller 200 can be configured to select a sensor 300 associated with a higher weight among the two sensors. Upon detecting a malfunction in the sensor 300 associated with the higher weight, the sensor controller 200 can be configured to select the sensor 300 associated with a lower weight among the two sensors. Such a method is not limited to only two sensors in a sensor group. The sensor group can include more than two sensors. The sensor group can include three, fourth, or any greater number of sensors to be selected from. Each sensor can be associated with a weight based on a certain factor, such as sensing accuracy. Upon detecting a malfunction in a first sensor 301 associated with a certain weight, the sensor controller 200 can be configured to select the second sensor 302 associated with a lower weight among the two sensors 301, 302. In other words, upon detecting a malfunction in a first sensor 301 associated with a higher weight among sensors 301, 302, the sensor controller 200 can be configured to select the second sensor 302 associated with a lower weight among the two sensors 301, 302.

For example, assuming both of the GPS sensors 311, 312 are in the data source 309 (as shown in FIG. 10) but are assigned different weights, respectively, the first GPS sensor 311 can be assigned a higher weight than the second GPS sensor 312. In order to provide sensor data of the GPS sensor data type, the sensor controller 200 can select the first GPS sensor 311. Upon detecting a malfunction in the GPS sensor, the sensor controller 200 can be configured to select the second GPS sensor 312.

Such a method can be applied to a sensor group having more than two sensors. For example, upon detecting a malfunction in a first sensor 301 associated with a higher weight, the sensor controller 200 can be configured to select a second sensor 302 associated with a lower weight than the first sensor 301. A third sensor (not shown) may have a lower weight than the second sensor 302. Upon detecting a malfunction in the second sensor 302, the sensor controller 200 can be configured to select the third sensor.

Advantageously, selecting the sensors based on weight can achieve greater sensing accuracy and save sensor cost. The mobile platform 100 may include two or more sensors associated with the same sensor data type. In order to save cost, the mobile platform 100 may include a sensor 300 with higher accuracy and higher cost, and a sensor 300 with lower accuracy and lower cost. When the sensor 300 with a higher accuracy is functioning normally, the sensor controller 200 can select the sensor 300 with a higher accuracy. The sensor controller 200 can select the sensor 300 with a lower accuracy upon detecting a malfunction of the sensor 300 with the higher accuracy. The sensor 300 with the lower accuracy may still function sufficiently well to ensure reliability of the mobile platform 100 and prevent accident. Thus, cost can be saved while the mobile platform 100 can still operate safely.

Figure 12:
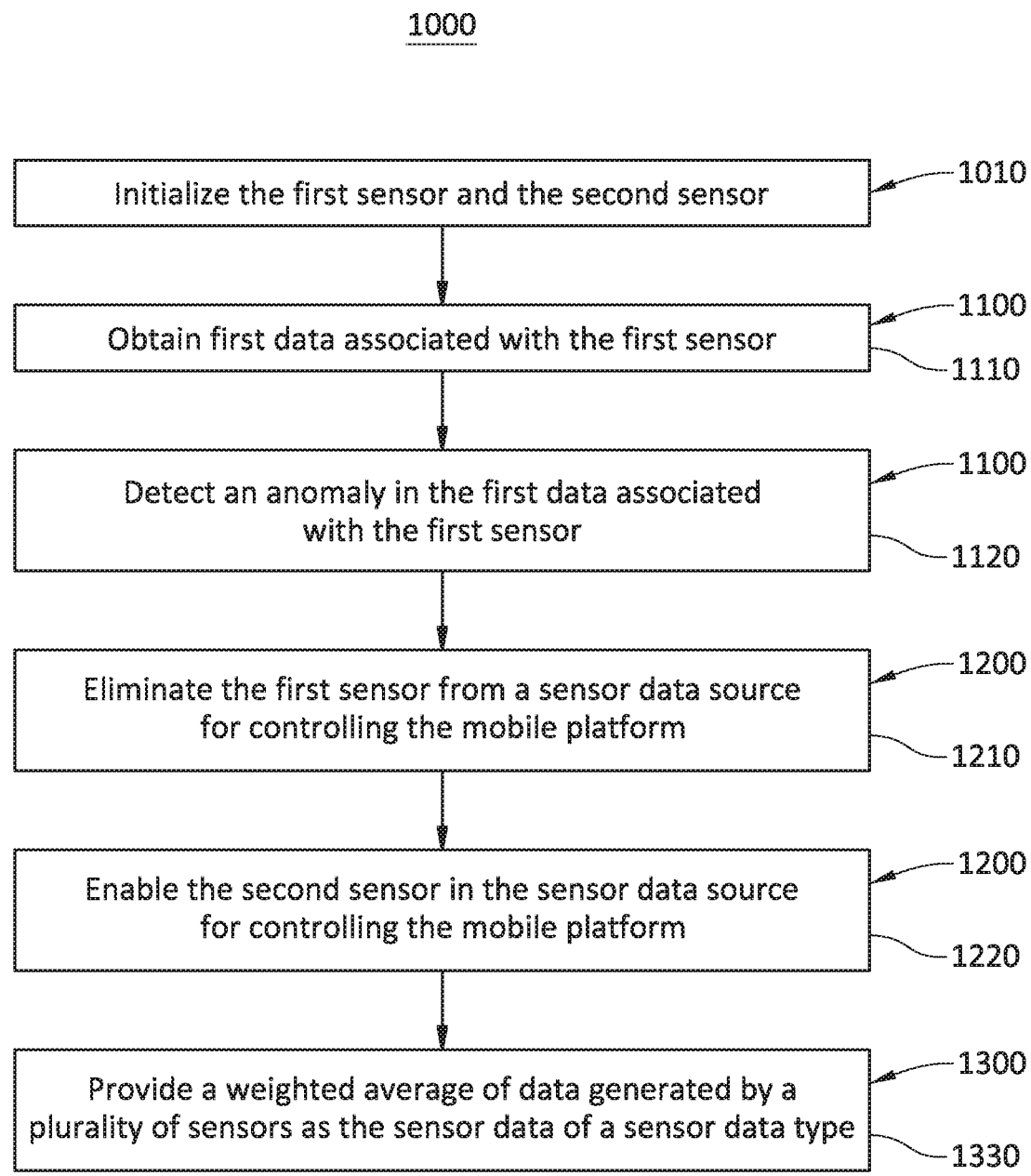
FIG. 12 is an exemplary flow chart illustrating another alternative embodiment of the method of FIG. 7, wherein a weighted average of data generated by a plurality of sensors is provided.

FIG. 12 is an exemplary flow chart illustrating another alternative embodiment of the method 1000 of FIG. 7. A weighted average of data generated by a plurality of sensors 300 is provided, at 1330, as the sensor data of a sensor data type. The sensor controller 200 can be configured to calculate the weighted average based on the data obtained from a plurality of sensors 300 in a sensor group. The weight can be determined in any suitable manners, without limitation.

In one non-limiting example, the weighted average can include a greater weight for a sensor 300 having a greater accuracy. For example, assuming both of the GPS sensors 311, 312 are in the data source 309 (as shown in FIG. 10), but GPS sensor 311 is of higher precision and high cost than the second GPS sensor 312, a higher weight can be assigned to the first GPS sensor 311. Thus, advantageously, the weighted average can be more accurate.

In another non-limiting example, the weighted average can include an equal weight for two or more selected sensors of the plurality of sensors. In other words, when the sensors 300 in a sensor group are uniform and/or different, an equal weight can be assigned to each of the sensors 300 in the sensor group, to advantageously simplify calculation of the weighted average.

As shown in FIGS. 4-6, an apparatus for operating the mobile platform 100 is provided. The apparatus can include the sensor controller 200 associated with the mobile platform 100 and communicating with a first sensor 301 and a second sensor 302. The sensor controller 200 can include one or more processors 211 configured to implement the method 1000 shown in FIGS. 2, 7-8, 11-12.

Figure 13:
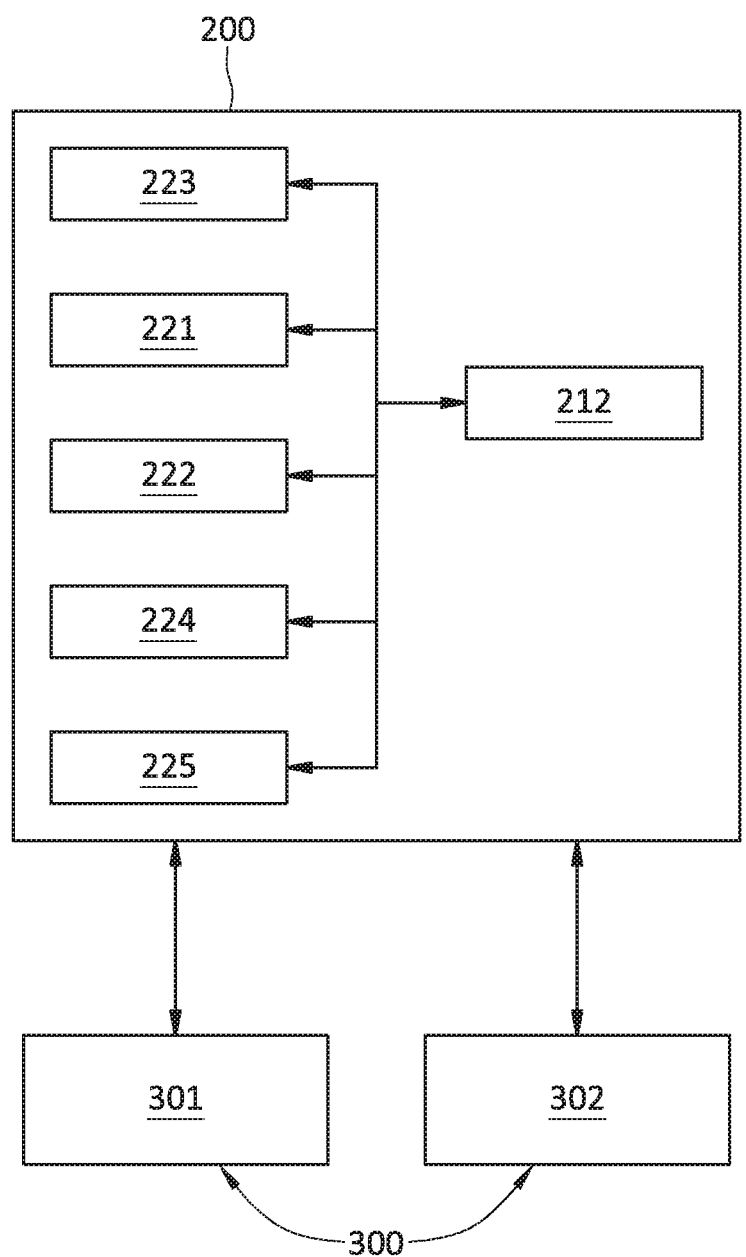
FIG. 13 is an exemplary diagram illustrating another alternative embodiment of the mobile platform of FIG. 1, wherein the sensor controller comprises a plurality of modules.

FIG. 13 is an exemplary diagram illustrating another alternative embodiment of the mobile platform 100 of FIG. 1, wherein the mobile platform 100 includes the sensor controller 200. The sensor controller 200 can include a plurality of modules 212, 221-225. Each of the plurality of modules 212, 221-225 can include microprocessor(s) and/or discrete circuit hardware for implementing functions of the sensor controller 200 as the method 1000 shown in FIGS. 2, 7-8, 11-12.

As shown in FIG. 13, the sensor controller 200 can include a detecting module 221 configured to detect a malfunction in a first sensor 301 (shown in 1100 in FIG. 2). The sensor controller 200 can include a switching module 222 configured to switch to a second sensor based upon the detected malfunction (shown in 1200 in FIG. 2).

The sensor controller 200 can further include an obtaining module 223 configured to obtain the first data associated with the first sensor 301 (shown in 1110 in FIG. 7). The sensor controller 200 can further include a processing module 224 configured to process data generated by at least one sensor in the sensor data source to provide sensor data of a sensor data type (shown in 1300 in FIG. 7).

In certain cases, the sensor controller 200 can be at least partially integrated with the main controller 400 (shown in FIG. 4) for controlling the mobile platform 100. Thus, the sensor controller 200 can further include a controlling module 225 configured to control the mobile platform 100 based on the provided sensor data.

The sensor controller 200 can further include a communication module 212 configured to include one or more communication interfaces for data and/or signal transmission between modules 221-225, and/or sensors 300.

In certain cases, the apparatus can be at least partially separated from a main controller 400 (shown in FIG. 5) and can be in communication with the main controller 400. The communication module 212 can be configured to send the provided sensor data to the main controller 400 for controlling the mobile platform 100, and/or receive control commands from the main controller 400.

Further, various embodiments disclosed herein provide a mobile platform 100 as shown in FIGS. 1, 3-6 and 13. The mobile platform 100 can include a sensor controller 200 associated with the mobile platform 100. The mobile platform 100 can include a first sensor 301 and a second sensor 302 each communicating with the sensor controller 200. The sensor controller 200 can be configured to detect a malfunction in the first sensor 301, and switch to the second sensor 302 based upon the detected malfunction. In certain embodiments, the mobile platform 100 can include a UAV.

Furthermore, various embodiments disclosed herein provide a kit for assembling the mobile platform 100 as shown in FIGS. 1, 3-6 and 13. The kit can include a sensor controller 200 configured to be associated with the mobile platform 100. The kit can include a first sensor 301 and a second sensor 302 each configured to communicate with the sensor controller 200. The mobile platform 100 can include a UAV. The kit can be used for assembling the mobile platform 100 instead of acquiring a factory-assembled mobile platform 100. In certain embodiments, an instruction manual can be included in the kit. The instruction manual may have instructions thereon. When an operator and/or assembly machine follows the instructions, the sensor controller 200, the first sensor 301 and/or the second sensor 302 can be assembled into the mobile platform 100 as shown in the present disclosure in FIGS. 1, 3-6 and 13.

Various embodiments further disclose computer program product comprising instructions for operating the mobile platform 100 in accordance with the method 1000 disclosed herein, e.g., as shown in FIGS. 2, 7 and 11-12. The program/software can be stored in a (non-transitory) computerreadable storage medium including, e.g., Read-Only Memory (ROM), Random Access Memory (RAM), internal memory, register, computer hard disk, removable disk, CD-ROM, optical disk, floppy disk, magnetic disk, or the like. The program/software can include coded instructions to instruct one or more processors on a computer device to execute the methods in accordance with various disclosed embodiments.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for operating a mobile platform, comprising:
    detecting a malfunction in a first sensor communicating with a sensor controller associated with the mobile platform; and
    switching to a second sensor communicating with the sensor controller based upon the detecting, wherein the detecting the malfunction comprises detecting an anomaly in data associated with the first sensor, the anomaly in data including noise associated with the data associated with the first sensor being greater than a predetermined noise level.

2. The method of claim 1, further comprising processing data generated by at least one sensor in a sensor data source to provide sensor data of a sensor data type.

3. The method of claim 2, further comprising controlling the mobile platform based on the provided sensor data.

4. The method of claim 2, wherein the processing comprises:
    selecting a sensor among two sensors in the sensor data source associated with respective weights and configured to generate data of the sensor data type, the weights being based on accuracy of the two sensors;
    selecting the sensor associated with a higher weight before detecting a malfunction in the sensor associated with the higher weight; and
    identifying data generated by the selected sensor as the sensor data of the sensor data type.

5. The method of claim 4, wherein the selecting comprises selecting the sensor associated with a lower weight among the two sensors upon detecting the malfunction in the sensor associated with the higher weight.

6. The method of claim 2, wherein the processing comprises providing a weighted average of data generated by a plurality of sensors as the sensor data of a sensor data type.

7. The method of claim 1, wherein the detecting the anomaly comprises detecting that the data associated with the first sensor has remained constant during a predetermined time interval.

8. The method of claim 1, wherein the detecting the anomaly comprises detecting that the data associated with the first sensor satisfies a cross-validation criterion comprising that:
    the data associated with the first sensor are inconsistent with respective data associated with a third sensor and a fourth sensor each being associated with the mobile platform; and
    the data associated with the third sensor is in agreement with the data associated with the fourth sensor.

9. An apparatus for operating a mobile platform, comprising:
    a sensor controller associated with the mobile platform and communicating with a first sensor and a second sensor, wherein the sensor controller comprises one or more processors configured to:
        detect a malfunction in the first sensor indicated by an anomaly in data associated with the first sensor, the anomaly in data including noise associated with the data associated with the first sensor being greater than a predetermined noise level; and
        switch to the second sensor based upon the detected malfunction.

10. The apparatus of claim 9, wherein the one or more processors are further configured to process data generated by at least one sensor in a sensor data source to provide sensor data of a sensor data type.

11. The apparatus of claim 10, wherein the one or more processors are further configured to control the mobile platform based on the provided sensor data.

12. The apparatus of claim 10, wherein the one or more processors are further configured to:
    select a sensor associated with a higher weight among two sensors in the sensor data source associated with respective weights and configured to generate data of the sensor data type, the weights being based on accuracy of the two sensors, and
    identify data generated by the selected sensor as the sensor data of the sensor data type.

13. The apparatus of claim 12, wherein the one or more processors are further configured to select the sensor associated with a lower weight among the two sensors upon detecting a malfunction in the sensor associated with the higher weight.

14. The apparatus of claim 10, wherein the one or more processors are further configured to provide a weighted average of data generated by a plurality of sensors as the sensor data of a sensor data type.

15. The apparatus of claim 9, wherein the anomaly in the first sensor comprises the data associated with the first sensor having remained constant during a predetermined time interval.

16. The apparatus of claim 9, wherein the anomaly in the first sensor comprises the data associated with the first sensor satisfying a cross-validation criterion comprising that:
    the data associated with the first sensor are inconsistent with respective data associated with a third sensor and a fourth sensor each being associated with the mobile platform; and
    the data associated with the third sensor is in agreement with the data associated with the fourth sensor.

* * * * *